(12) United States Patent
Burcham et al.

(10) Patent No.: US 9,165,177 B2
(45) Date of Patent: Oct. 20, 2015

(54) CONTACTLESS FINGERPRINT ACQUISITION AND PROCESSING

(75) Inventors: Joel Dean Burcham, Harvest, AL (US); Richard Leon Hartman, Huntsville, AL (US); William Caleb Lucas, Decatur, AL (US)

(73) Assignee: ADVANCED OPTICAL SYSTEMS, INC., Huntsville, AL (US)

( * ) Notice: Subject to any disclaimer, the term of this patent is extended or adjusted under 35 U.S.C. 154(b) by 467 days.

(21) Appl. No.: 13/268,103

(22) Filed: Oct. 7, 2011

(65) Prior Publication Data

US 2012/0086794 A1    Apr. 12, 2012

Related U.S. Application Data

(60) Provisional application No. 61/391,355, filed on Oct. 8, 2010, provisional application No. 61/500,182, filed on Jun. 23, 2011.

(51) Int. Cl.
*H04N 9/47* (2006.01)
*G06K 9/00* (2006.01)
*G06K 9/03* (2006.01)

(52) U.S. Cl.
CPC ............ *G06K 9/00033* (2013.01); *G06K 9/036* (2013.01)

(58) Field of Classification Search
USPC .......................................................... 348/77
See application file for complete search history.

(56) References Cited

U.S. PATENT DOCUMENTS

| 5,929,443 | A | * | 7/1999 | Alfano et al. ............... 250/341.3 |
| 6,404,904 | B1 | | 6/2002 | Einighammer et al. |
| 7,397,943 | B2 | | 7/2008 | Merbach et al. |
| 7,587,071 | B2 | | 9/2009 | Einighammer et al. |
| 7,599,531 | B2 | | 10/2009 | Hauke et al. |
| 7,660,442 | B2 | | 2/2010 | Sweeney et al. |
| 7,812,963 | B2 | | 10/2010 | De Groot |
| 2001/0026632 | A1 | * | 10/2001 | Tamai ............................ 382/116 |
| 2001/0041073 | A1 | * | 11/2001 | Sorek et al. .................... 396/431 |
| 2005/0226474 | A1 | | 10/2005 | Merbach et al. |
| 2005/0265586 | A1 | | 12/2005 | Rowe et al. |
| 2006/0113381 | A1 | | 6/2006 | Hochstein et al. |
| 2007/0040017 | A1 | | 2/2007 | Kozlay |
| 2007/0131759 | A1 | | 6/2007 | Cox et al. |
| 2008/0080751 | A1 | * | 4/2008 | Bee et al. ........................ 382/124 |
| 2008/0219522 | A1 | * | 9/2008 | Hook ............................. 382/124 |
| 2009/0245591 | A1 | * | 10/2009 | Rowe et al. .................... 382/115 |
| 2010/0014717 | A1 | | 1/2010 | Rosenkrantz |
| 2010/0165090 | A1 | | 7/2010 | Sweeney et al. |
| 2010/0172548 | A1 | | 7/2010 | Mil'Shtein et al. |
| 2011/0279663 | A1 | | 11/2011 | Fan et al. |
| 2012/0016798 | A1 | * | 1/2012 | Carper ............................ 705/43 |
| 2012/0076369 | A1 | | 3/2012 | Abramovich et al. |
| 2012/0086794 | A1 | | 4/2012 | Burcham et al. |

OTHER PUBLICATIONS

International Search Report for International Patent Application No. PCT/US2011/055192 filed Oct. 7, 2011.
(Continued)

*Primary Examiner* — Dave Czekaj
*Assistant Examiner* — Leron Beck
(74) *Attorney, Agent, or Firm* — Cantor Colburn LLP

(57) ABSTRACT

A contactless fingerprint acquisition and processing method, includes detecting and acquiring an object image, converting the object image into a fingerprint image and at least one of identifying and verifying the fingerprint image.

20 Claims, 22 Drawing Sheets

(56) References Cited

OTHER PUBLICATIONS

Written Opinion for International Patent Application No. PCT/US2011/055192 filed Oct. 7, 2011.

International Preliminary Report on Patentability for International Patent Application No. PCT/US2011/055192 filed Oct. 7, 2011, 6 pages.

International Search Report for International Application No. PCT/US15/15538; International Filing Date: Feb. 12, 2015; Date of Mailing Jun. 3, 2015; 7 pgs.

Written Opinion of the International Searching Authority for International Application No. PCT/US15/15538; International Filing Date: Feb. 12, 2015; Date of Mailing: Jun. 3, 2015; 4 pages.

* cited by examiner

CONTACTLESS FINGERPRINT ACQUISITION AND PROCESSING

CROSS-REFERENCE TO RELATED APPLICATIONS

The present application claims the benefit of provisional application No. 61/391,355 filed Oct. 8, 2010, the contents of which is hereby incorporated by reference in its entirety. The present application also claims the benefit of provisional application No. 61/500,182 filed Jun. 23, 2011, the contents of which is also hereby incorporated by reference in its entirety.

BACKGROUND

This application relates to fingerprint collection sensors, specifically a non-contact mechanism that works at varying distances away from the finger.

Implementation of biometric data such as fingerprints is becoming increasingly popular. However, conventional implementations of acquiring fingerprint data require either contact or close proximity of the finger near the sensor. In addition, conventional methods do not provide identification and verification of individual fingerprints.

SUMMARY OF THE INVENTION

Exemplary embodiments include a contactless fingerprint acquisition and processing method, including detecting and acquiring an object image, converting the object image into a fingerprint image and at least one of identifying and verifying the fingerprint image.

Additional exemplary embodiments include a computer program product having a non-transitory computer readable medium storing instructions for causing a computer to perform a contactless fingerprint acquisition and processing method. The method includes detecting and acquiring an object image, converting the object image into a fingerprint image and at least one of identifying and verifying the fingerprint image.

Further exemplary embodiments include a contactless fingerprint acquisition and processing system, including a housing, a processor disposed in the housing, a detector assembly operatively coupled to the processor and configured to acquire fingerprint images and a process configured to detect and acquire an object image, convert the object image to a fingerprint image, enroll the fingerprint image, and at least one of identifying and verifying the fingerprint image.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION

Exemplary embodiments include systems and methods for acquiring fingerprint data with sensors that do not require contact with the finger or palm. It will be appreciated that the exemplary embodiments described herein apply to apparatuses that can acquire fingerprints from relatively large distances such as up to two meters away from the apparatus, and apparatuses that can acquire fingerprints in closer proximity such as 2-6 inches (approximately 50 mm to 150 mm) away from the apparatus. It is understood that these ranges are just examples and are not limiting in any way. It is further understood that the term "fingerprint" includes any identifying impression of the fingers, thumb, palm, hand or combinations thereof. The terms may be used interchangeably, but are understood to cover the individual fingers, thumb, palm, hand or combinations as described.

Figure 1:
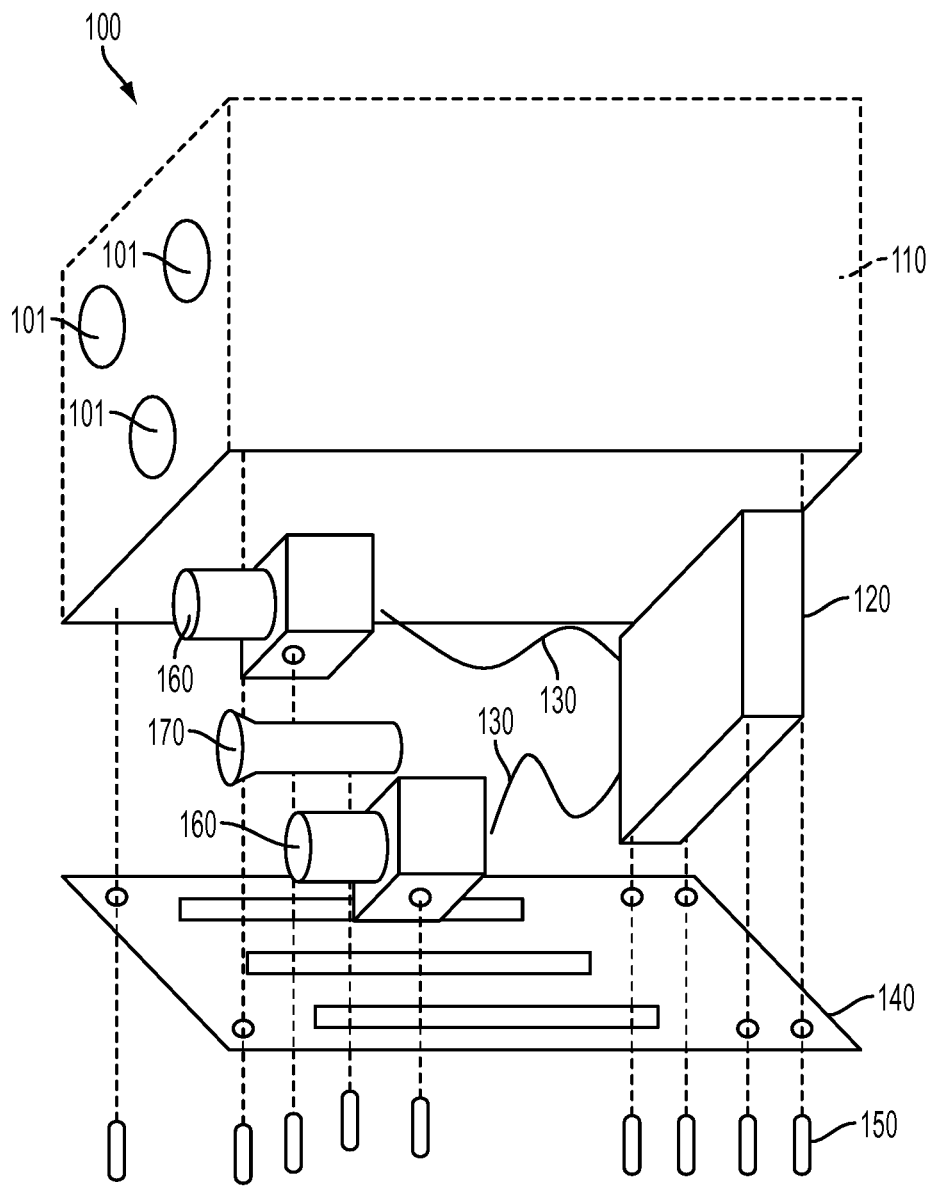
FIG. 1 illustrates an exploded view of an exemplary contactless fingerprint acquisition and processing apparatus.

FIGS. 1 and 2 illustrate exploded views of an exemplary embodiment of a contactless fingerprint acquisition apparatus 100. A case 110 covers and protects the other components in the apparatus 100. In exemplary embodiments, the case 110 can be multiple sizes and made from other materials such as wood, plastic, steel, and the like. The case 110 has multiple holes 101 disposed in a front end to accommodate detector assemblies 160 and light sources 170. As illustrated, three holes 101 accommodate two detector assemblies 160 and a light source 170 as further described herein. The holes 101 are sized to have a minimal gap around the two detector assemblies and the light source without obscuring two detector assemblies 160 and the light source 170. The case 110 has additional holes on the opposite side from the previously discussed three holes. The additional holes in the case are sized for a power connection and an external communications port such as USB, Ethernet, FireWire, etc., and further described herein.

Referring still FIG. 1, a base 140 attaches to the case and the two detector assemblies 160 and the light source 170, and a computer 120. The computer can be any suitable computing device as described further herein. In addition, the computer 120 can be internal to the case 110 as shown, or external and detachable from the case 110. Attachment devices 150 such as screws (e.g., ¼×20) are used to attach the base 140 to the case 110, the two detector assemblies 160, the light source 170, and the computer 120. The holes 101 for the two detector assemblies 160 and the light source 170 are slotted to support aligning the two detector assemblies 160 and the light source 170 within the case 110.

As illustrated, the computer 120 in is a single board computer that inputs the data format output by the detector assemblies 160 and passed over cables 130. The computer 120 has a processor that executes computer code following the flowcharts described further herein. The computer 120 also includes communications ports that output the processed fingerprint data. As further described herein, the communications ports can be any suitable communication port such as but not limited to Ethernet, serial, USB and the like. The computer 120 has a power connection to receive external direct current power or other suitable power sources. The computer 120 can receive power from a variety of sources such as alternating current and direct current. Power sources may include but are not limited to one or more batteries, wall power in the United States or other countries, or power from another device. The computer 120 is described further herein in greater detail.

Referring still to FIG. 1, the light source assembly 170 outputs suitable radiation for interaction with a user's hand. For example, the radiation can be a beam of polarized white electromagnetic radiation, such that the beam width exceeds the size of a hand to be processed by the apparatus 100 and can be output. Other wavelengths of electromagnetic radiation, both visible and invisible, may be implemented. The light source assembly 170 is powered from the computer 120, but may also be powered externally or from a battery.

The light source assembly 170 is illustrated in an exploded view in FIG. 2, which shows the components of a light source assembly 230 including a lens 231, a polarizer 233 and a light source 232. The polarizer 233 is fitted to the front of the light source 230 with any suitable attachment device such as glue, screws, clips, tape, etc.

Figure 3:
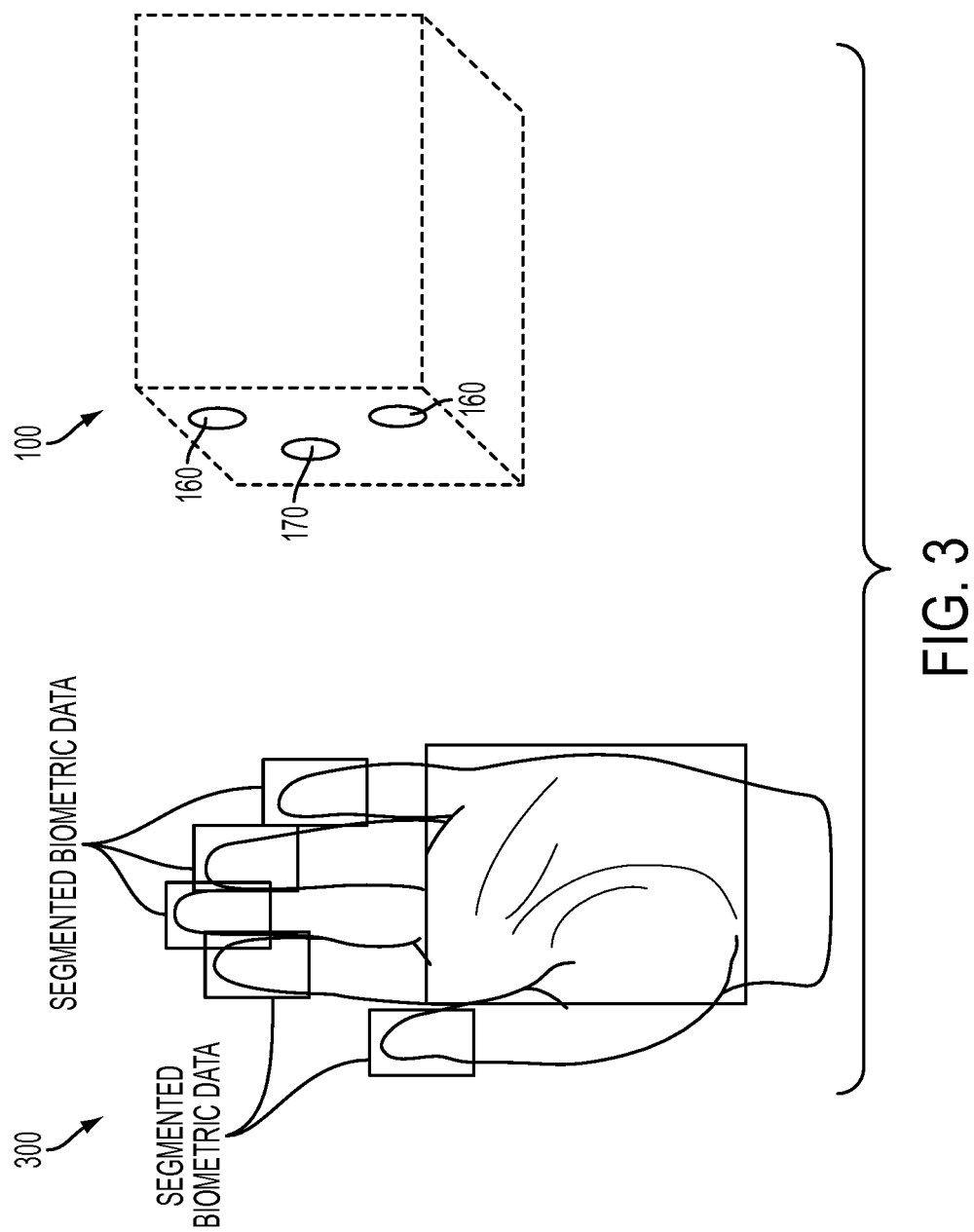
FIG. 3 illustrates a perspective view of the apparatus of FIG. 1 assembled in accordance with exemplary embodiments, including an image of a hand detailing a subset of the areas of a hand that can be segmented for output.

Referring again to FIG. 1, the detector assemblies 160 collect data from a hand located at multiple distances from the detector assemblies 160. For example, the hand can be one meter from the detector assemblies 160. It will be appreciated that in different exemplary embodiments, the distance from the detector assemblies 160 to the hand can vary from millimeters to multiple meters depending on the parameters of the detector assemblies 160 chosen. For example, the distance from the detector assemblies 160 to the hand can vary based on the detector resolution, the desired resolution of the output data, and parameters of the detector assemblies 160. FIG. 3 illustrates a hand 300 separated from the apparatus 100 to allow for data collection from the hand 300. The detector assemblies 160 are mounted such that they both point to the hand 300. As described herein, the distance from the detector assemblies 160 to the hand 300 can vary based on the detector resolution, the desired resolution of the output data, and the properties of the detector assemblies 160. Data from the detector assemblies 160 are output to the computer 120 across the cables 130 (see FIG. 1). Power to the detector assemblies 160 can be supplied from the computer 120 across the cables 130, for example, or from independent connections.

Figure 2A:
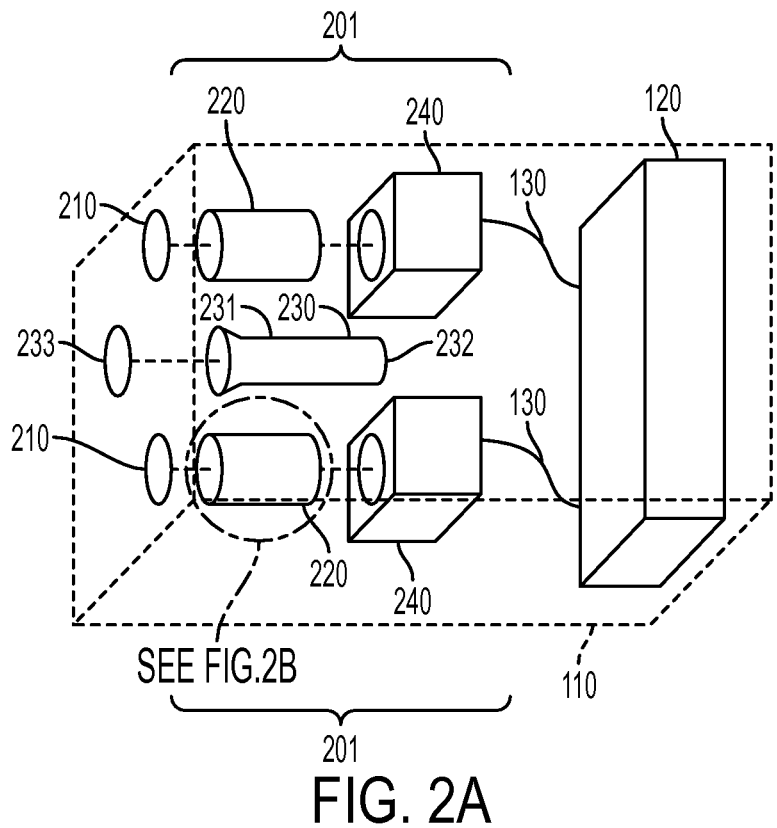
FIG. 2A illustrates an overhead view of the apparatus of FIG. 1 with an exploded view exemplary detector assemblies.
Figure 2B:
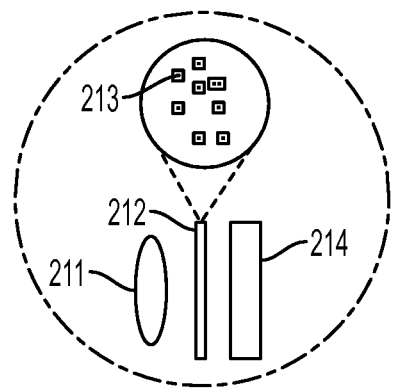
FIG. 2B illustrates a view of an embodiment of a lens configuration.

FIG. 2A illustrates that each detector assembly 201 includes a lens 220, a polarizer 210, and a detector 240, and FIG. 2B illustrates a view of an embodiment of a lens configuration. The detector assembly 201 produces data based on the incident electromagnetic radiation. In exemplary embodiments, the data represents a planar, pixelized representation of the hand 300. The lens 220 focuses the electromagnetic radiation into the detector assemblies. The polarizer 210 filters the incoming electromagnetic radiation to pass only a specific orientation of the electromagnetic radiation. The only difference between the two detector assemblies from FIG. 1 is the orientation of the polarizers 210. On one detector assembly 201 the polarizer 210 can be set to match the orientation of the polarizer 233 from the light source assembly 230. The other detector assembly 201 polarizer 210 can be set out of phase (e.g., 90 degrees out of phase) from the light source assembly polarizer 233. It can be appreciated that other orientations other than 90 degrees out of phase and circular polarization are contemplated. Various polarization options are also contemplated based on various algorithms and detector methods as described further herein. It will also be appreciated that in other exemplary embodiments, no polarization can be implemented.

FIG. 3 illustrates one embodiment in which the apparatus 100 can collect data from the hand 300. The hand 300 is placed one meter from the apparatus 100 such that the hand 300 is in the electromagnetic radiation from the light source 170. The detector assemblies 160 collect electromagnetic radiation reflected from the hand 300. Data from the detector assembly 160 is passed into the computer for processing (e.g., see FIG. 2).

It can be appreciated that the embodiments illustrated in FIGS. 1-3 can include additional detector assemblies. In addition, various orientations of the detector assemblies are also contemplated. Additional detector assemblies can provide greater area of the measured fingerprint, for example. In addition, the detector assemblies described herein can include additional functionality, including, but not limited to auto focus, which provides greater tolerance around placing the hand one meter from the apparatus, and auto zoom, which allows the hand to be placed as much as several meters from the apparatus or as little as centimeters from the apparatus and still function properly. In addition, the exemplary apparatuses described herein can be separated to include multiple cases for one or more of the components described herein, which can provide greater flexibility for installations. The apparatus 100 in FIG. 1 may be installed in a structure such as a wall, doorframe, portal, and the like, thereby allowing fingerprints to be collected with or without cooperation of the individual. As further described herein, the computer can be internal or external to the case of the apparatus. In addition, the case 110 can be configured to include other pieces of equipment, such as, but not limited to a card reader, an iris scanner (or other biometric readers), a keyboard, and the like.

In exemplary embodiments, several focus options are further contemplated. At short distances, depth of field can create issues in an optical system. That is, an object is in focus only a short distance away from the plane of optimum focus. Depth of field is given by:

$$DOF \approx 2N_c \frac{m+1}{m^2} \quad \text{Equation (1)}$$

where N is the f/ number, c is the circle of confusion, and m is the magnification. Equation (1) is one approximation for short distances. It can be appreciated that here are other approximations in other exemplary embodiments. According to Equation 1, the depth of field is small if the f/number N is small (i.e., aperture is big, to collect light), and if the circle of confusion is small. The latter is the case in modern digital focal planes, where the pixel size can become relatively small.

In one embodiment, the depth of field can be less than one millimeter for close finger print capture. In another embodiment, the depth of field can be less than one centimeter for longer range finger print capture. As further described herein, exemplary signal processing compensates for out of focus finger images. In exemplary embodiments, effective focus of the apparatuses described herein can be enhanced prior to signal processing. The focusing methods now described can be performed in addition to any other mechanical movement of the lenses as in many autofocus techniques.

In exemplary embodiments, one focus technique is multi-frame focus. Several pictures are taken at different focus conditions. The different focus conditions can be achieved by allowing the user to move relative to the detector assemblies or by driving the detector assemblies described herein through a range of settings. can be done by allowing the finger to move relative to the sensor, or by driving the sensor focus through a range of settings. A series of images are then collected. The apparatus can then select the most in-focus image (i.e., through a focus quality algorithm). The most in-focus image can then be used going forward. In another embodiment, the series of images are analyzed for segments that are in focus. In-focus segments are extracted from the series of images, and fused together into one in-focus image of the entire field of view.

In exemplary embodiments, another focus technique is coded aperture focus. The coded aperture technique adds a mask to camera aperture of the detector assemblies described herein, and performs computations to generate an in-focus image. In a coded aperture, the aperture includes of many sub-apertures, typically by placing a mask in the aperture. In exemplary embodiments, the mask is not a simple checkerboard, because a simple checkerboard pattern can cause too many redundancies. FIG. 2 further illustrates an example of one of the lenses 220 having a coded aperture structure in accordance with an exemplary embodiment. It is understood that the coded aperture structure is just an example of the type of lens structure that can be implemented. The coded aperture lens structure includes a main lens 211, a coded aperture mask 212 having a series of apertures 213, and a focal plane detector array 214. Any sub-aperture focuses an object spot on the image plane, with an image spot size (i.e., blur circle) depending on how close the object is to the object focal plane. Thus, the distance to any object spot is given by the image spot size. The spot images can then be deconvolved, and added in such a way as to have the entire image in focus. In operation, the coded aperture mask 212 is added to the optical train of one of the detector assemblies (i.e., detector assembly 201). Furthermore, a software algorithm can be implemented to convert the coded aperture image to an in-focus image is added to the software train. The aperture code can be designed to optimize performance for a particular class of images; therefore, the code can be designed to optimize performance against finger images. In this way, no mechanical motions are needed and only one image is taken and recorded. In addition, all other steps to bring the image into focus are in digital image processing.

In exemplary embodiments, another focus technique is a focus trap. A focus trap uses image analysis to determine if an image is in focus, typically the analysis used by an auto-focus camera. Instead of using the image analysis signal to drive the focus mechanism, it is used to trigger an image capture when the image is in focus. In exemplary embodiments, optical elements can be added to the exemplary detector assemblies described herein to perform the analysis, which is considered a phase technique. In another embodiment, the apparatuses described herein can compare the relative intensity of near-by pixels, since intensity contrast increases as focus improves, which is a contrast method. As such, the contrast method does not add any further components to the detector assemblies described herein. A high pass filter can be added to the image processing methods described herein to determine if the image is in focus. This additional signal processing is in addition to the algorithm that determines triggering by detecting the cessation of motion as described further herein. In this way, an in-focus image is provided to the rest of the processing algorithms.

In exemplary embodiments, another focus technique is stereo deconvolution. As described further herein, deconvolution is implemented to improve the apparent focus of the image. However, the focus enhancement can be limited because different images may be a different focal distances, requiring different deconvolution kernels. A single image of a finger includes sections that are at different distances, and a measurement of several fingers may have different fingers at different distances. In exemplary embodiments, stereo deconvolution implements a two lens stereo camera. The stereo effect is used to determine the distance to any given potion of the image, and the deconvolution kernel appropriate to that distance is implemented. As such stereo deconvolution provides an improved focus image with a minimum of artifacts.

It will be appreciated that the systems and methods described herein can also generate three dimensional representations of a fingerprint.

Figure 4:
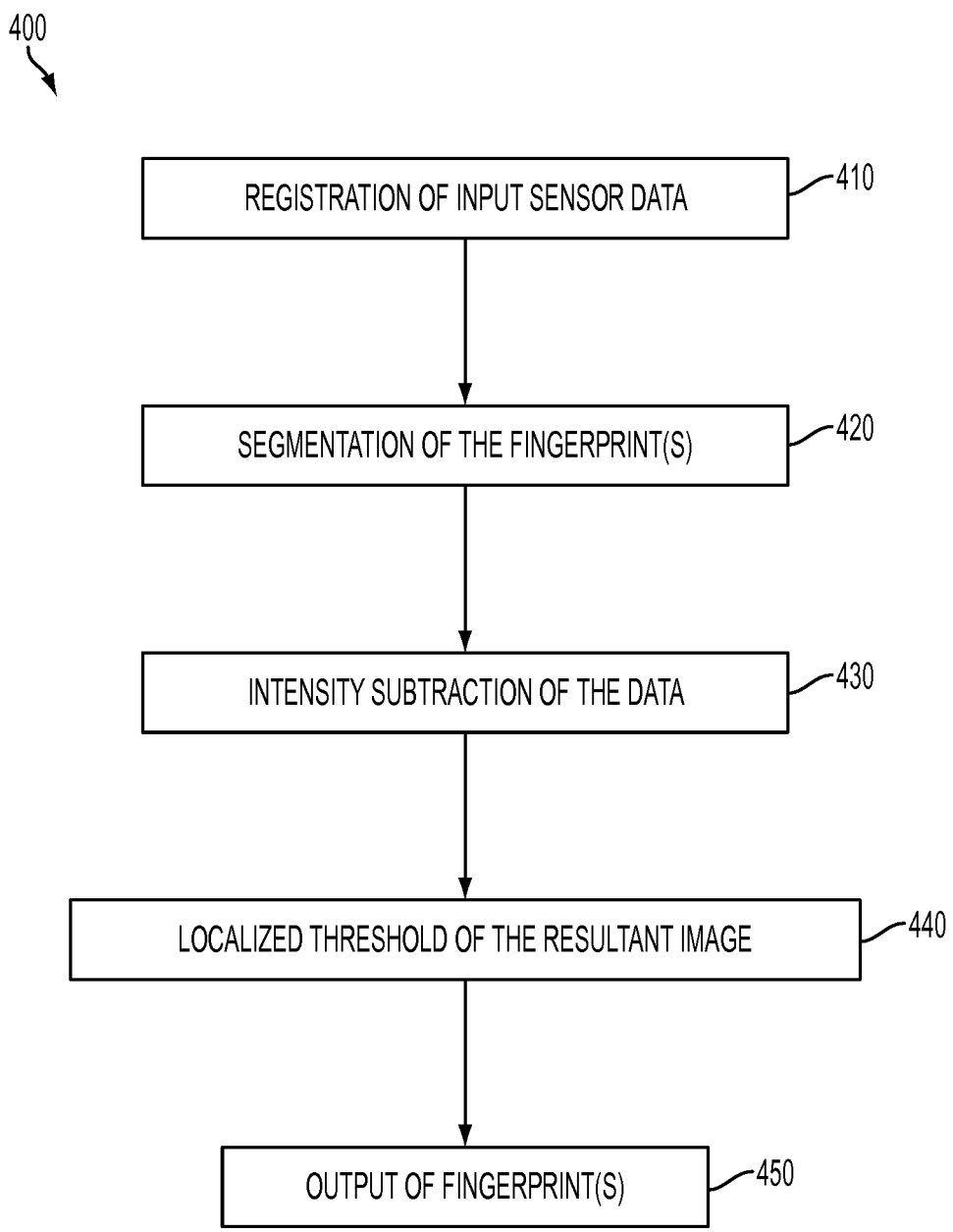
FIG. 4 displays a flowchart of a method for processing the data from the detector assemblies in accordance with exemplary embodiments.

FIG. 4 displays a flowchart of a method 400 for processing the data from the detector assemblies in accordance with exemplary embodiments. At block 410, the method 400 registers the data sets from each detector assembly. In exemplary embodiments, the registration can implement an affine transform. Block 410 provides offset, scale and warping adjustments to allow the hand data from each detector assembly to overlay precisely.

At block 420, the method 400 segments the sections of the hand for further processing. As shown by the hand drawing in FIG. 4, the segmentation may include individual finger tips, multiple finger tips, palm, and the like. Block 420 also isolates the hand data from any spurious background data.

At block 430, the method 400 uses the registration information from step Block 410 to difference the segmented hand data from the two detector assemblies. This difference provides additional background noise suppression, minimizes glare or intensity variations across the finger data, and increases the contrast between the ridges and valleys of fingerprints due to the polarization variation in the data sets. Block 430 differences the two sets of data from the detector assemblies to produce a resultant computer image for further processing.

At block 440, the method 400 further reduces any remaining variation in the intensity across the resultant image. Block 440 may be skipped if the resultant image intensity of the segmented hand is sufficiently uniform across the image. Otherwise, a sliding window can be created that is approximately 10% of the size of the image. A histogram is created from the data in the window and two peaks are identified from the histogram representing the peaks and valleys. The data in the window are then normalized and contrast stretched. This process is repeated as the widow slides across the full image. It can be appreciated that other methods to reduce variation are contemplated in other exemplary embodiments.

At block 450, the method 400 outputs the fingerprint data. Block 450 formats the image into the output format and transmits the data from the apparatus. The output format can be but is not limited to JPEG compressed, raw, ANSI 378 template, etc.

Figure 5:
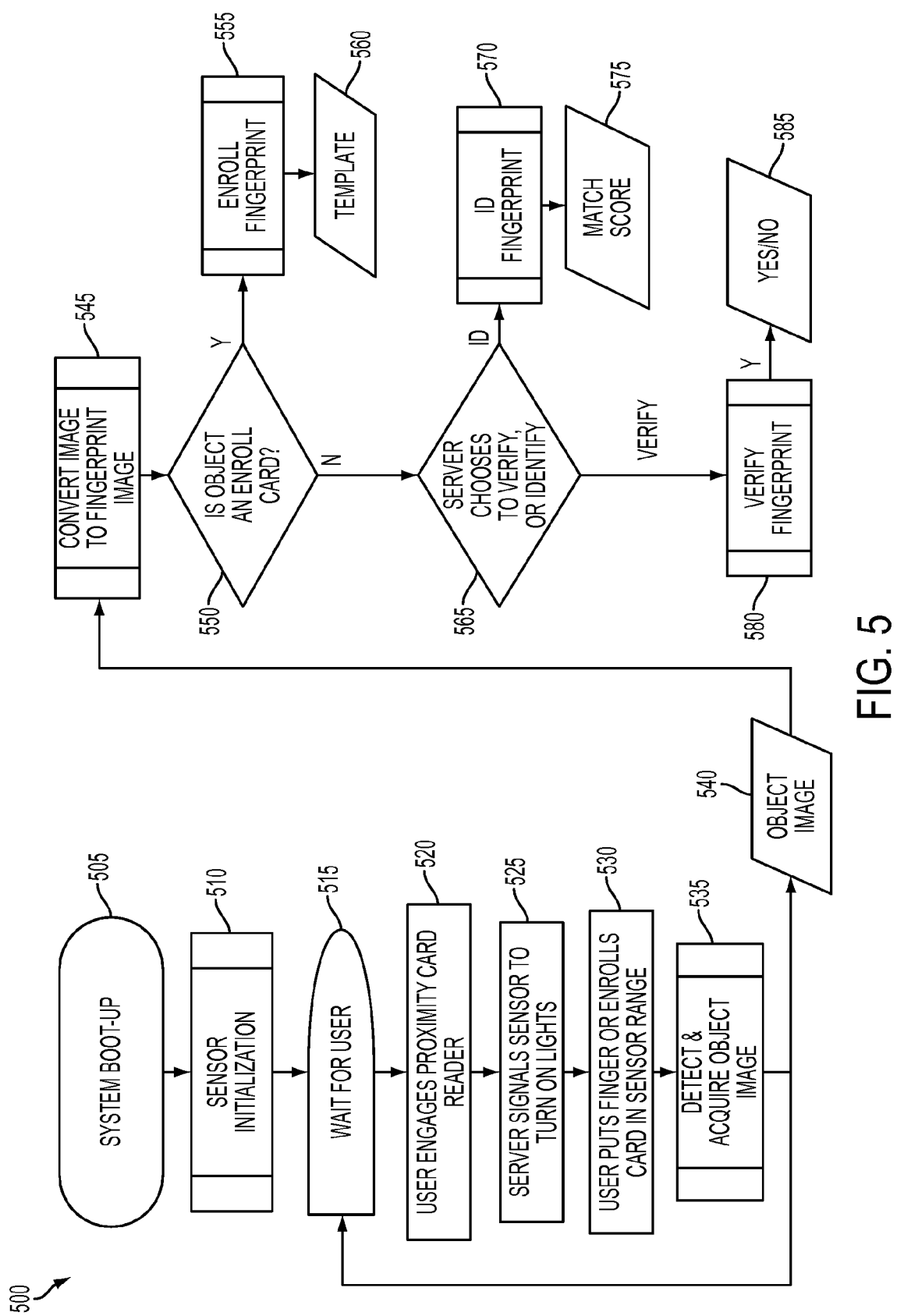
FIG. 5 illustrates a flow chart for an overall contactless acquisition and processing method in accordance with exemplary embodiments.

FIG. 5 illustrates a flowchart for an overall contactless acquisition and processing method 500 in accordance with exemplary embodiments. The "system" refers to any of the exemplary systems described herein. At block 505, the system boots up. At block 510, the system initializes the sensors (e.g., the detector assemblies). At block 515, the system waits for a user to place his/her hand in front of the sensors. At block 520, a use can place a suitable object such as the finger or an enrollment card in front of the sensors. In exemplary embodiments, enrollment is the process of acquiring an individual's fingerprint into the system the first time. As such, a Master enrollment card can be read by the fingerprint reader. An operator can put the card in the reader, which would then switch the system to enrollment mode. A user (i.e., client) can then put their finger in the system, and the system would add the fingerprint to the data base, along with identifying information. In exemplary embodiments, the enrollment card can be a one-time use card, which can be discarded after the user enrolls the fingerprint into the system. Regardless of the object placed in front of the sensor, at block 525, the system server signals the system to power on the light source assembly. At block 530, the user then places his/her finger or enrollment card into the sensor range, which as described herein can be various distances from the sensor. At block 535, the system detects and acquires the image of the object generating an object image at block 540. It can be appreciated that the system can have a predetermined set of images stored. As such, the system can include an initial recognition of suitable objects. For example, the system can initially screen to determine if the object is a recognizable object such as a finger or enrollment card. If the object is not recognizable such as a wallet or set of car keys, the system can generate an alert and message that a suitable object should be placed. The system can go into a loop with block 515 to be in a constant wait mode for objects to be placed in front of the sensor.

At block 545, the system converts the image to a fingerprint image. At block 550, the system determines if the fingerprint image from block 545 is an enrollment card. If the fingerprint image is an enrollment card at block 550, then at block 555, the system goes into enrollment mode and registers the fingerprint, which stores the fingerprint in the system for future detection and recognition. At block 560, the system generates a template that stores the fingerprint in the system. If at block 550, the fingerprint image is not an enrollment card, then at block 565, the system decides to verify or identify the fingerprint image from block 545. At block 570, the system can compare against a set of previously stored fingerprints in the system. The currently acquired fingerprint can be assigned a score of how close the currently acquired fingerprint is compared to the stored fingerprint. In exemplary embodiments, if the score is above a predetermined threshold, then the fingerprint is sufficiently identified and the score can be output at block 575. At block 580, the system verifies that the currently acquired fingerprint matches a previously stored fingerprint or set of fingerprints from one individual, and then the system can generate an appropriate message and alert at block 585. If the fingerprint has not been properly identified/verified, the user can have the fingerprint re-acquired. It will be appreciated that other methods for contactless fingerprint acquisition and processing are contemplated in other exemplary embodiments.

Figure 6:
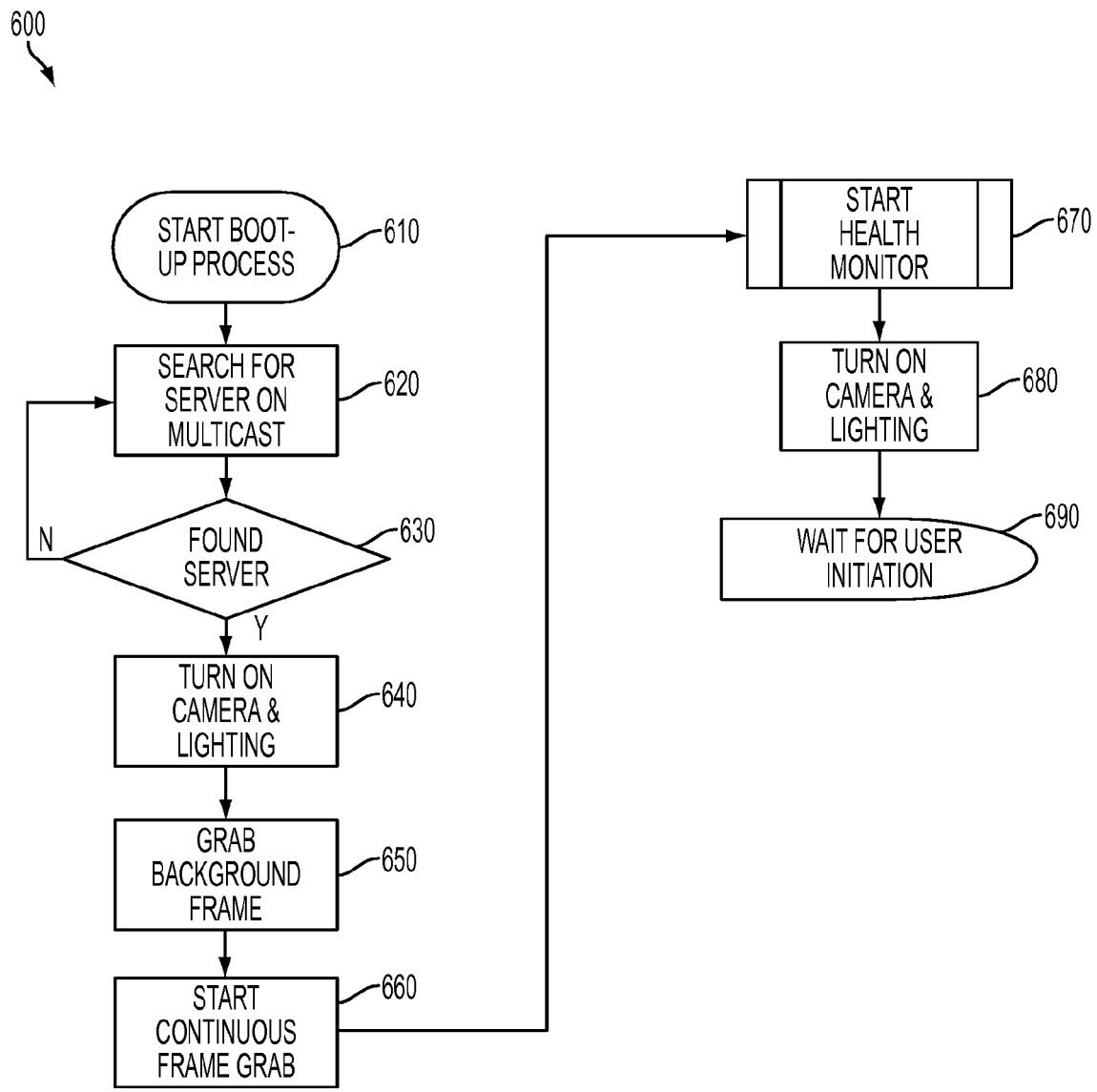
FIG. 6 illustrates a flowchart for a method of sensor initialization in accordance to exemplary embodiments.

FIG. 6 illustrates a flowchart for a method 600 of sensor initialization in accordance to exemplary embodiments. The method 600 further describes block 510 in FIG. 5. At block 610, the system starts a boot process. At block 620, the system uses multicast to search for a server. At block 630, the system determines if a server has been located. In exemplary embodiments, there can be multiple redundant servers that store fingerprints. At block 640, if a server has been found, then the system powers the detector assemblies and light source assemblies (and the overall apparatus 100). At block 650, the system can acquire a background frame to determine background noise, baselines and the like. At block 660, the system can then enter a continuous frame grab loop, such as the loop with block 515 in FIG. 5. At block 670, the system can initiate a health monitor to measure the health of the system. In exemplary embodiments, the data grabbed at blocks 650, 660 can be used to determine if the system is operating within tolerance. At block 680, the system can then power the detector assemblies and light source assemblies. At block 690 the system can then wait for use initiation, such as the loop with block 515 in FIG. 5. It can be appreciated that other methods to operate the system on a single computer are contemplated in other exemplary embodiments.

Figure 7:
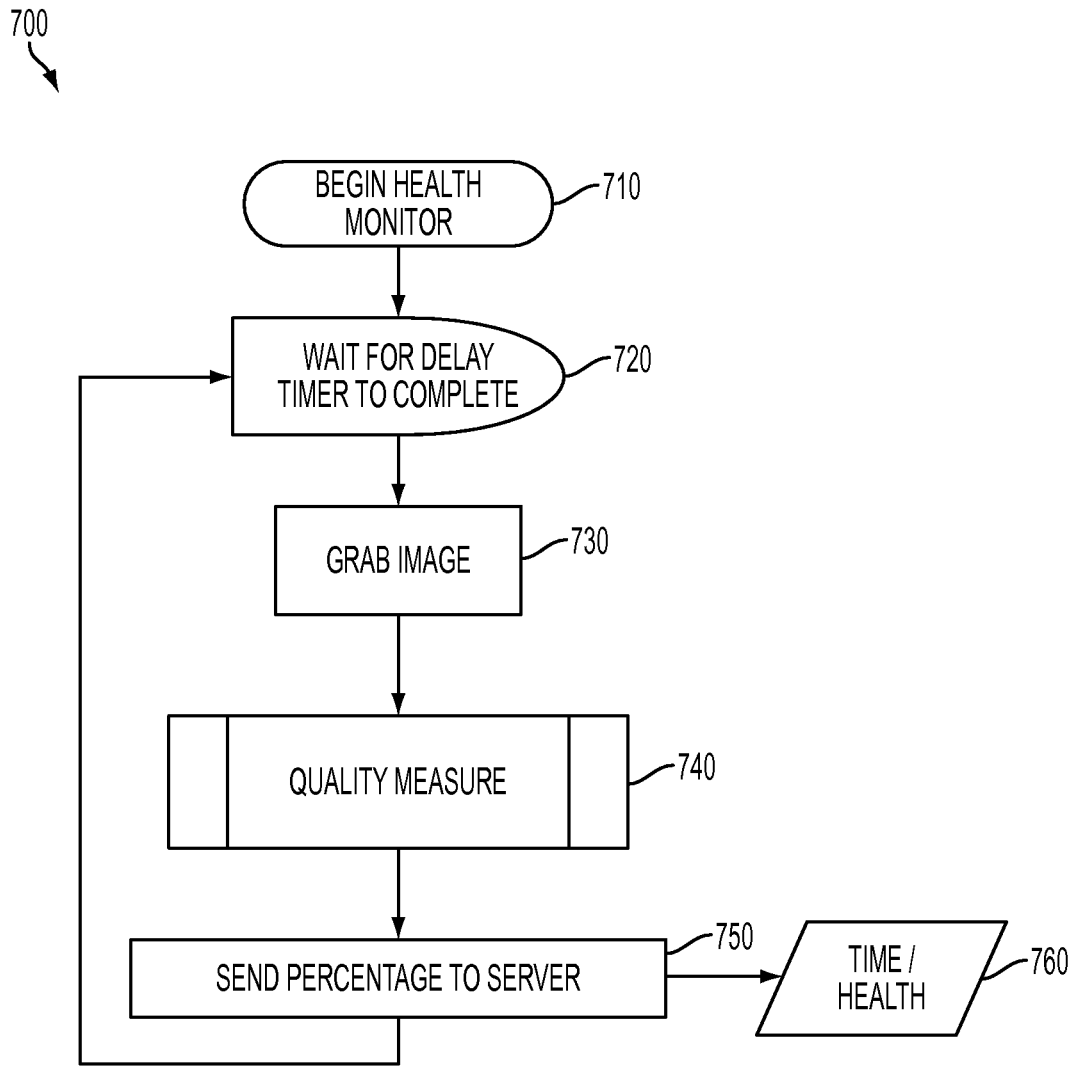
FIG. 7 illustrates a flowchart for a method for monitoring the health of the system in accordance with exemplary embodiments.

FIG. 7 illustrates a flowchart for a method 700 for monitoring the health of the system in accordance with exemplary embodiments. The method 700 further describes block 670 in FIG. 6. The system could degrade with time, and fail or give false negatives. Such degradation could happen because moisture gets onto the lens, dirt gets in somehow onto the lens, the window gets dirty, or the focal plane itself degrades with usage. The health monitor checks image quality of a pattern on the background (the lip at the bottom) on a periodic basis, and reports if it falls below a certain value, calling for maintenance. At block 710, the system initiates a health monitor process. At block 720, the system waits for a delay timer to complete. In exemplary embodiments, a delay timer can indicate that a suitable time period has passed before continuing to execute the monitoring method. At block 730, the system can grab an image. The image can be any background image that the system can test. At block 740, the system measures the quality of the grabbed image at block 730. In exemplary embodiments, the system can include predetermined quality criteria to which the grabbed image can be prepared. At block 750, the system can generate and send a percentage of image quality to the server. At block 760, the system can then send and store a time and health indication.

Figure 8:
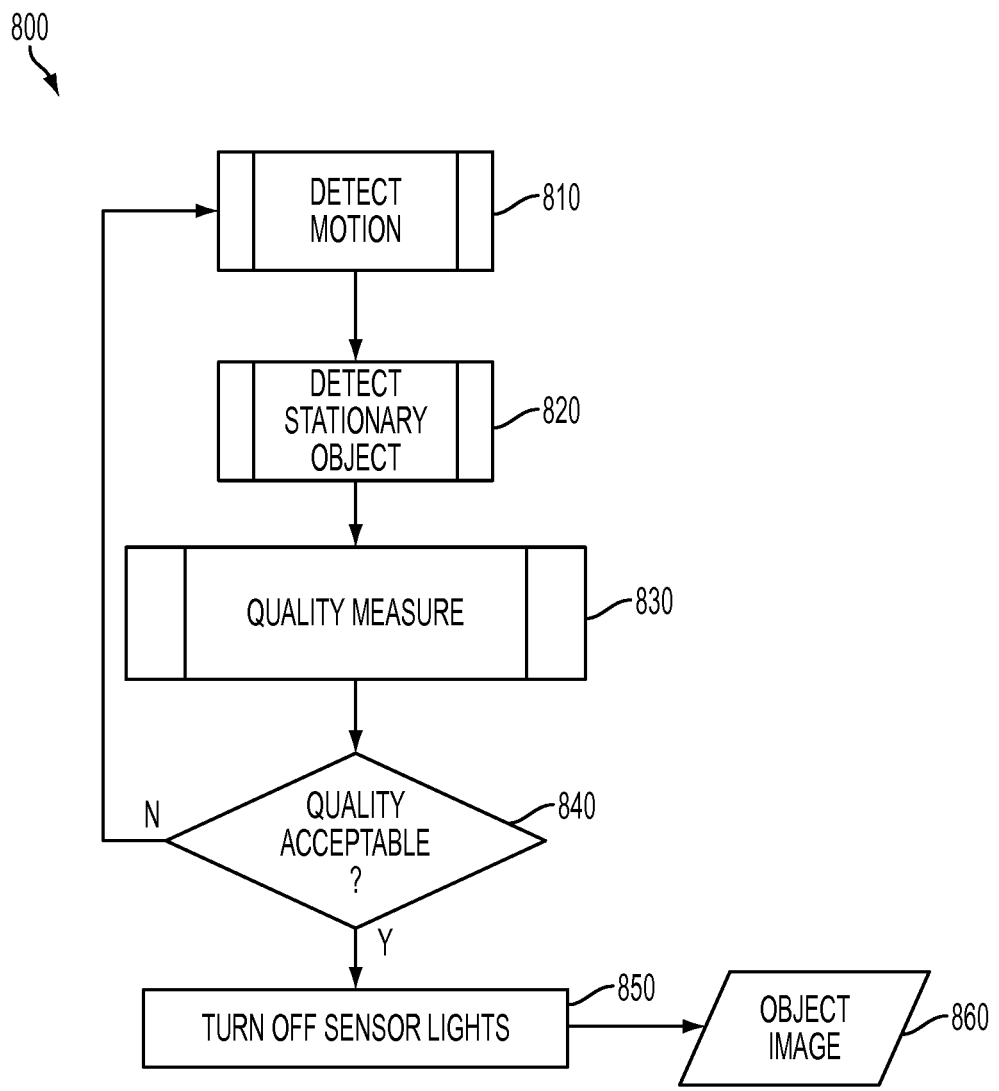
FIG. 8 illustrates a flowchart of a method for detecting and acquiring a finger image in accordance with exemplary embodiments.

FIG. 8 illustrates a flowchart of a method 800 for detecting and acquiring a finger image in accordance with exemplary embodiments. The method 800 further describes block 535 of FIG. 5. At block 810, the system detects motion, and at block 820 detects a stationary object, which can be, for example, the finger or the enrollment card as described herein. At block 830, the system then measures the quality of the acquired image. As described herein, the quality determination can be made based on predetermined parameters. At block 840, the system can then determine if the quality is acceptable. If the quality is not acceptable at block 840 then the method 800 can continue at block 810 until the quality is acceptable at block 840. In exemplary embodiments, the system can keep acquiring an image unbeknownst to the user or the system can alert the user to reposition the object. If the quality is acceptable at block 840, then at block 850 the system can turn off the sensor, which can also be an indication to the user that it is permissible to remove the object. At block 860, the system generates the object image, as in block 540 of FIG. 5.

Figure 9:
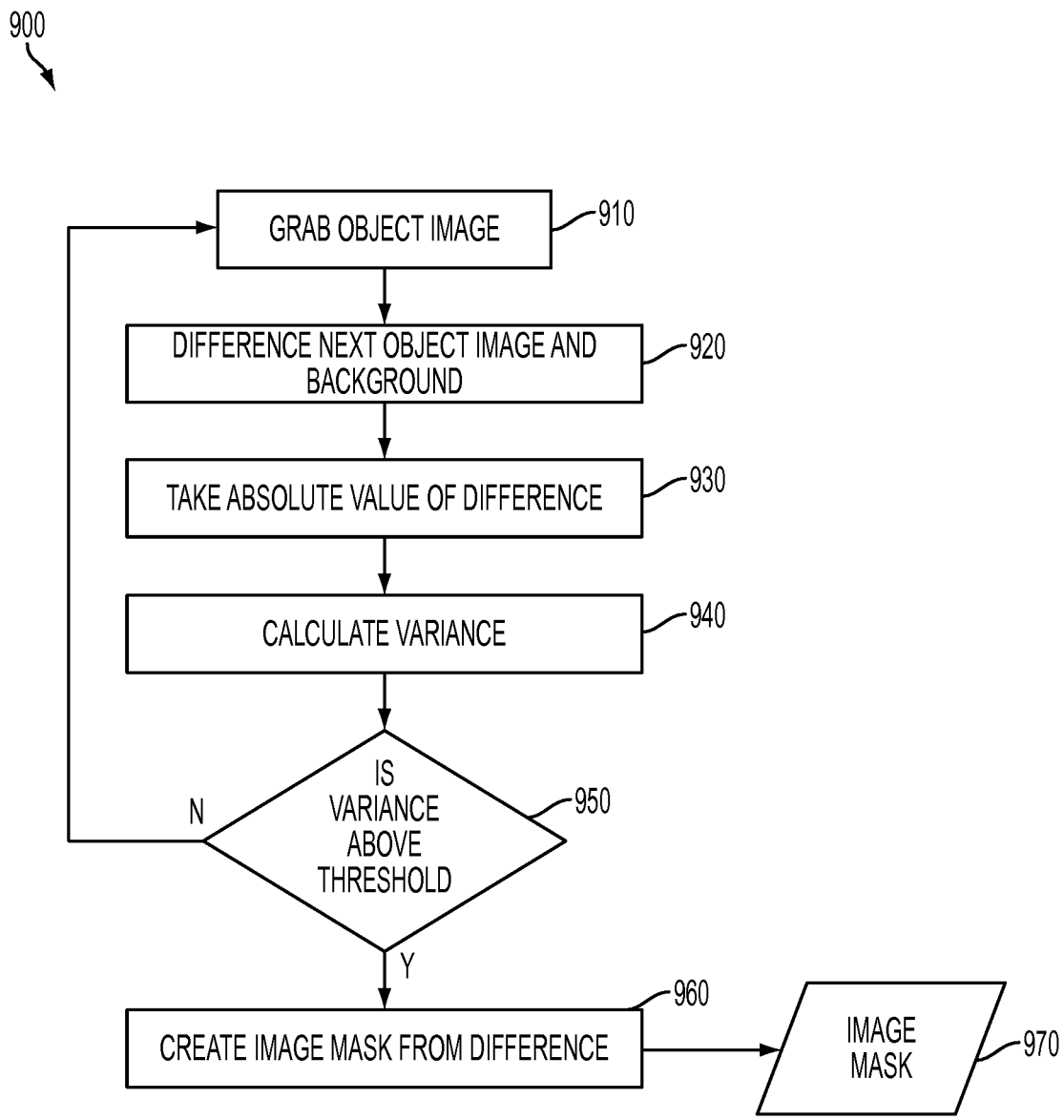
FIG. 9 illustrates a flowchart of a method for detecting motion in accordance with exemplary embodiments.

FIG. 9 illustrates a flowchart of a method 900 for detecting motion in accordance with exemplary embodiments. The method 900 further describes block 810 in FIG. 8. At block 910, an image can be acquired as described herein. At block 920, the system can compare the object image with a background image previously measured. The system can then determine a difference between the acquired image and the background, and take an absolute value of the difference at block 930. At block 940, the system can then calculate a variance based on the difference measured at blocks 920, 930. At block 950, the system determines if the variance is above a predetermined threshold. If there variance is not above the threshold, then the method continues at block 910. In exemplary embodiments, if the variance is not above the threshold, then the system assumes that the background image is still in view and no motion is occurring. If the threshold is above the threshold is different, then the system assumes that motion is occurring and an image mask can be generated at block 960 based on the difference that is measured at block 920, 930. At block 970, the image mask is generated and stored.

Figure 10:
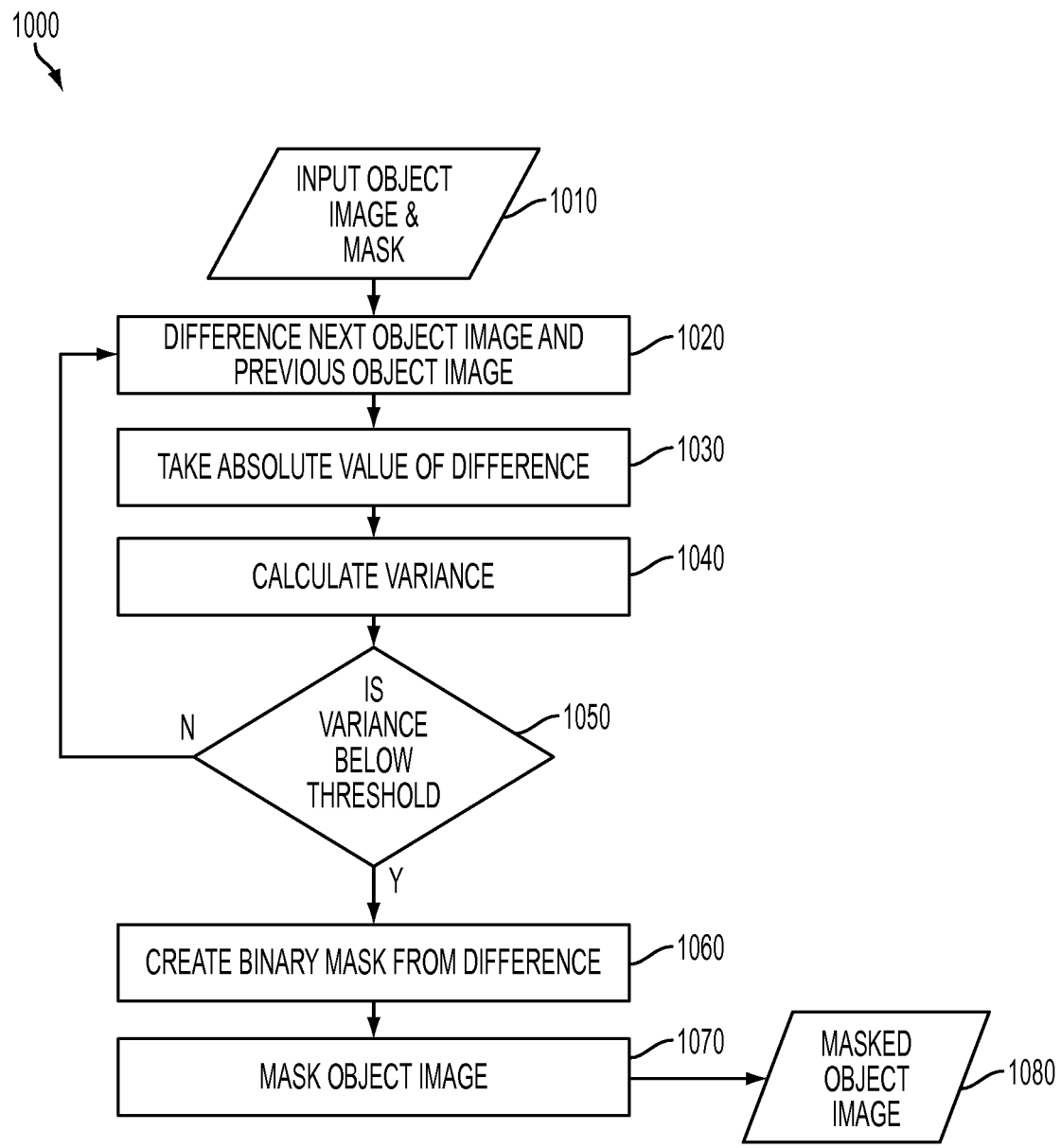
FIG. 10 illustrates a flowchart of a method for detecting a stationary object in accordance with exemplary embodiments.

FIG. 10 illustrates a flowchart of a method 1000 for detecting a stationary object in accordance with exemplary embodiments. The method 1000 further describes block 820 in FIG. 8. As described herein, an image is stored (see block 540 in FIG. 5 and block 860 in FIG. 8 for example). In addition, an object mask is stored (see block 970 in FIG. 9). At block 1010, the system receives the grabbed image and the mask. In exemplary embodiments, the original object image can be cropped down to only the portion that is different from the background as described herein. At block 1020, the system can then determine a difference between the acquired image and the previously acquired image, and take an absolute value of the difference at block 1030. At block 1040, the system can then calculate a variance in the difference. At block 1050, the system can determine if the variance is below a threshold. If the variance is not below a threshold at block 1050, then the method continues at block 1020. The system assumes that there is not a new object if the variance is below the predetermined threshold. At block 1060, if the system determines that the variance is above the threshold, the system creates a binary mask from the difference calculated at blocks 1020, 1030, and a mask object image is generated at block 1070, and stored at block 1080.

Figure 11:
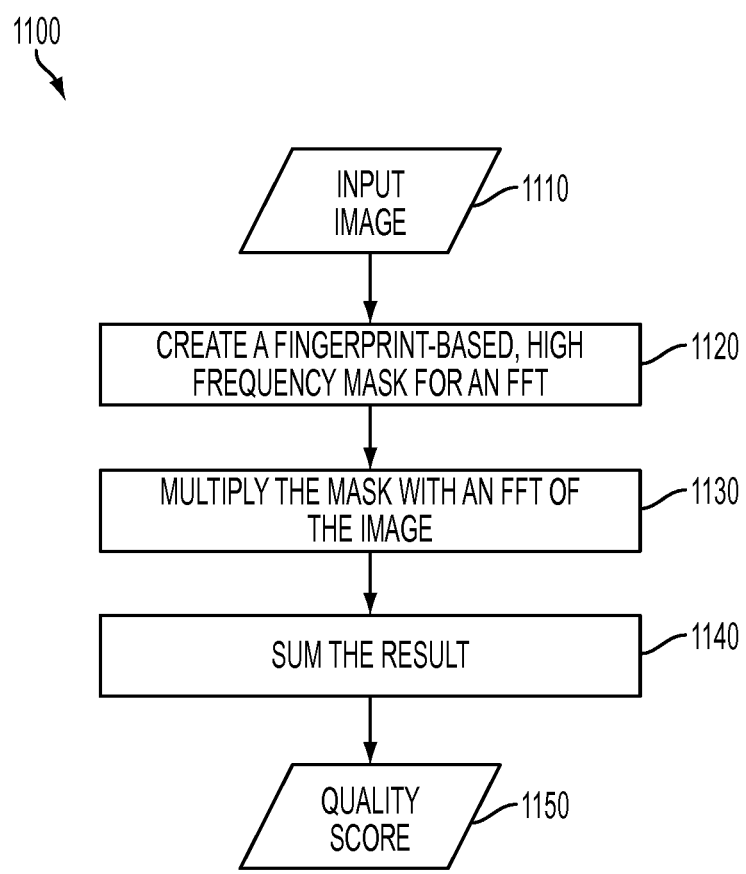
FIG. 11 illustrates a flowchart of a method for measuring quality of an acquired image in accordance with exemplary embodiments.

FIG. 11 illustrates a flowchart of a method 1100 for measuring quality of an acquired image in accordance with exemplary embodiments. As described herein, acquired images (see block 540 in FIG. 5 and block 860 in FIG. 8 for example) can have their quality measured (see block 740 in FIG. 7 and block 830 in FIG. 8 for example). In exemplary embodiments, the system can measure a percentage of frequency content above a predetermined threshold in order to determine a measurement quality. It is understood that in other exemplary embodiments, other measurement quality techniques are contemplated. At block 1110, the system receives the input image. At block 1120, the system creates a fingerprint based high frequency mask, for a fast Fourier Transform (FFT), for example. At block 1130, the system multiplies the mask with an FFT of the image. At block 1140, the system can sum the result and generate a quality score at block 1150.

Figure 12:
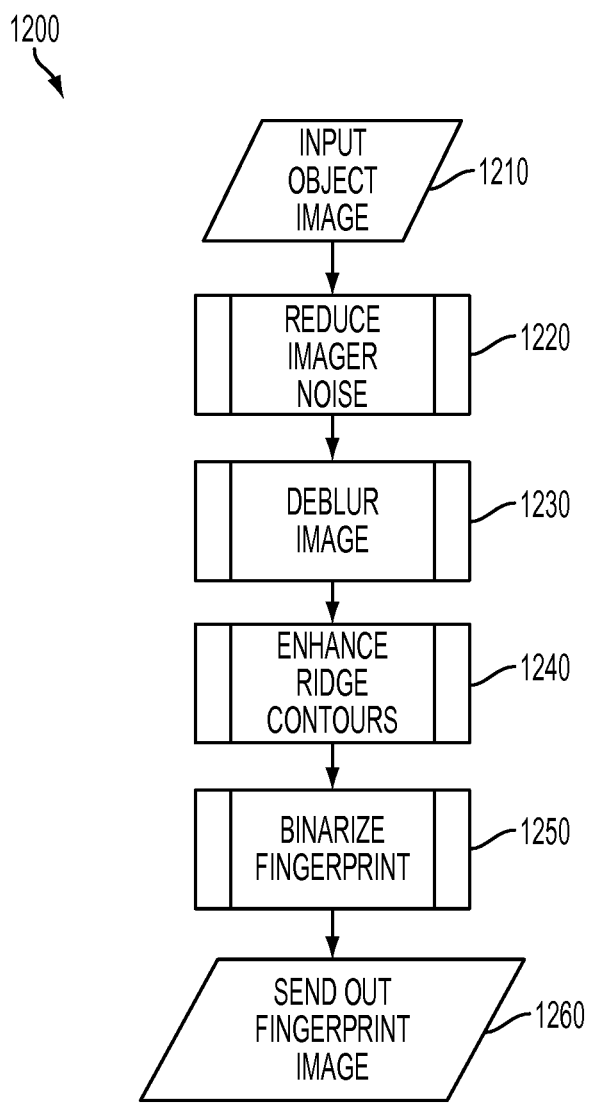
FIG. 12 illustrates a flowchart of a method for converting an acquired image to a fingerprint image in accordance with exemplary embodiments.

FIG. 12 illustrates a flowchart of a method 1200 for converting an acquired image to a fingerprint image in accordance with exemplary embodiments. The method 1200 further describes block 545 in FIG. 5. At block 1210, the system can receive the acquired object image images (see block 540 in FIG. 5 and block 860 in FIG. 8 for example). At block 1220, the system can reduce the imager noise. At block 1230, the system can deblur the image. At block 1240, the system can enhance ridge contours. At block 1250, the system can binarize the fingerprint. At block 1260, the system can send and store the fingerprint image. It will be appreciated that other methods for converting an acquired image to a fingerprint image are contemplated in other exemplary embodiments.

Figure 13:
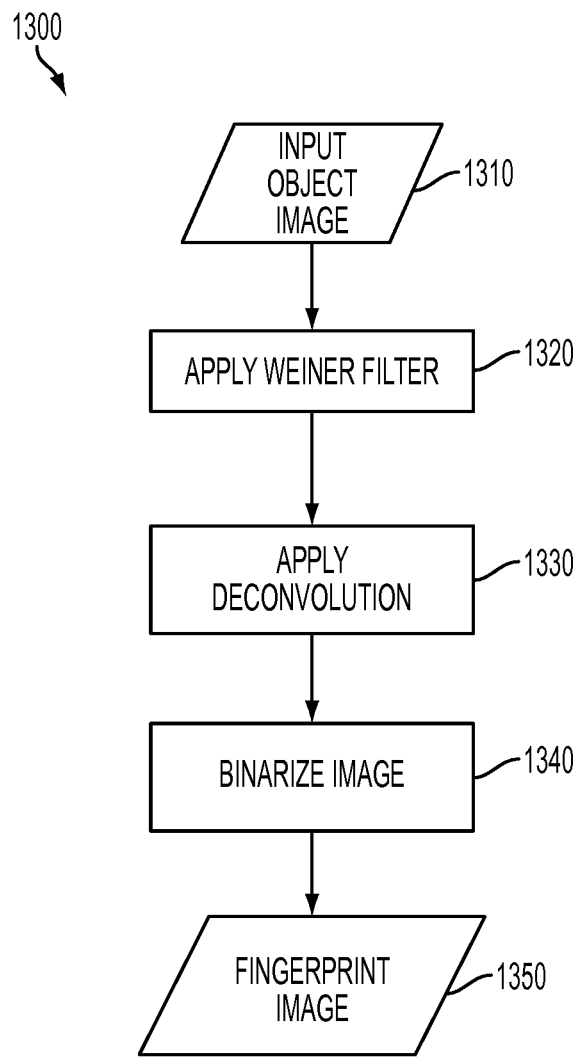
FIG. 13 illustrates a flowchart of another method for converting an acquired image to a fingerprint image in accordance with exemplary embodiments.

FIG. 13 illustrates a flowchart of a method 1300 for converting an acquired image to a fingerprint image in accordance with exemplary embodiments. At block 1310, the system can receive the acquired object image images (see block 540 in FIG. 5 and block 860 in FIG. 8 for example). At block 1320, the system can apply a Wiener filter to reduce the imager noise. At block 1330, the system can apply deconvolution to deblur the image. At block 1340, the system can binarize the fingerprint. At block 1350, the system can send and store the fingerprint image.

Figure 14:
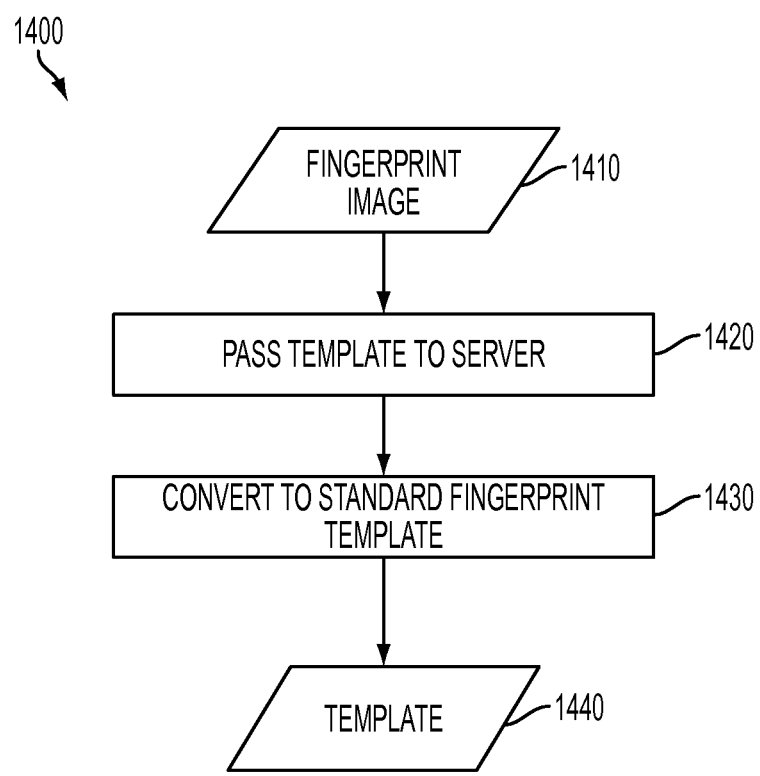
FIG. 14 illustrates a flowchart of a method for fingerprint enrollment in accordance with exemplary embodiments.

FIG. 14 illustrates a flowchart of a method 1400 for fingerprint enrollment in accordance with exemplary embodiments. The method 1400 further describes block 555 in FIG. 5. In exemplary embodiments, after obtaining the enrollment card, the server requests that the sensor collect another fingerprint image. The next image collected is converted to a template and passed on for enrollment with the other user templates. At block 1410, the fingerprint image generated by the system (see FIGS. 12 and 13 for example) is received. At block 1420, the fingerprint image generated by the system (see block 560 in FIG. 5 for example) is sent to the server. At block 1430, the fingerprint image can be converted to any standard fingerprint template, and at block 1440 the template is stored.

Figure 15:
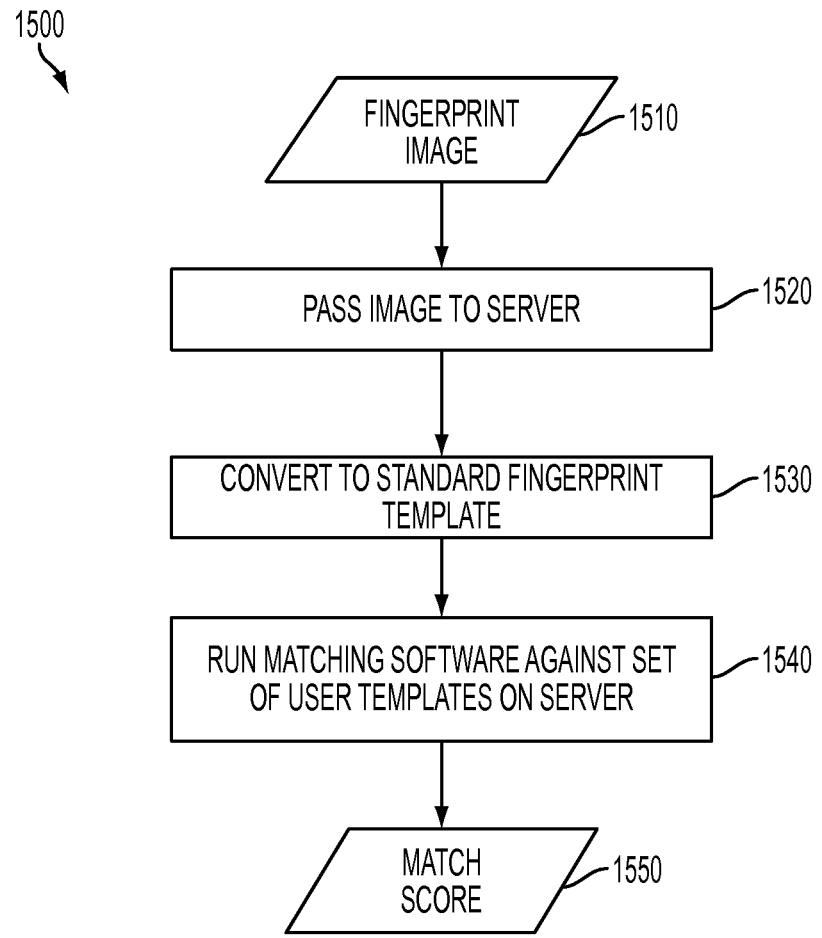
FIG. 15 illustrates a flowchart of a method for fingerprint identification in accordance with exemplary embodiments.

FIG. 15 illustrates a flowchart of a method 1500 for fingerprint identification in accordance with exemplary embodiments. The method 1500 further describes block 570 in FIG. 5. At block 1510, the fingerprint image generated by the system (see FIGS. 12 and 13 for example) is received. At block 1520, the fingerprint image is passed to the server. At block 1530, the fingerprint image is converted to a standard fingerprint template. At block 1540, matching software can be run against a set of user templates on the server, and a match score can be generated at block 1550.

Figure 16:
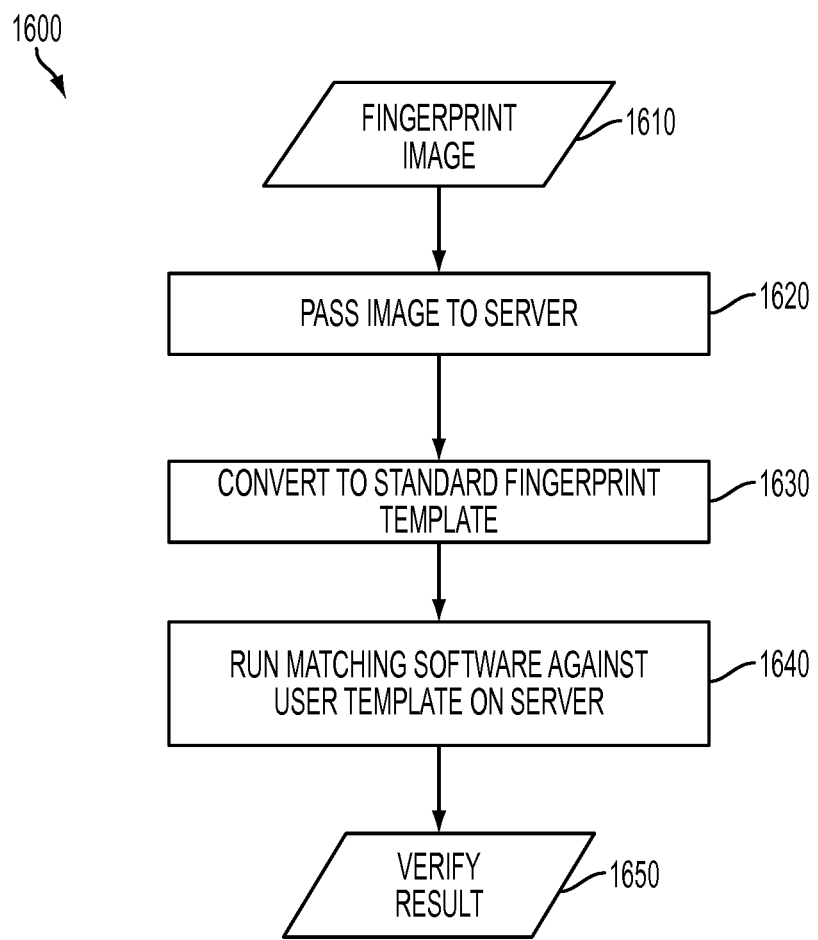
FIG. 16 illustrates a flowchart of a method for fingerprint verification in accordance with exemplary embodiments.

FIG. 16 illustrates a flowchart of a method 1600 for fingerprint verification in accordance with exemplary embodiments. The method 1600 further describes block 580 in FIG. 5. At block 1610, the fingerprint image generated by the system (see FIGS. 12 and 13 for example) is received. At block 1560, the fingerprint image is passed to the server. At block 1630, the fingerprint image is converted to a standard fingerprint template. At block 1640, matching software can be run against a set of user templates on the server, and a verification result can be generated at block 1550.

Figure 17:
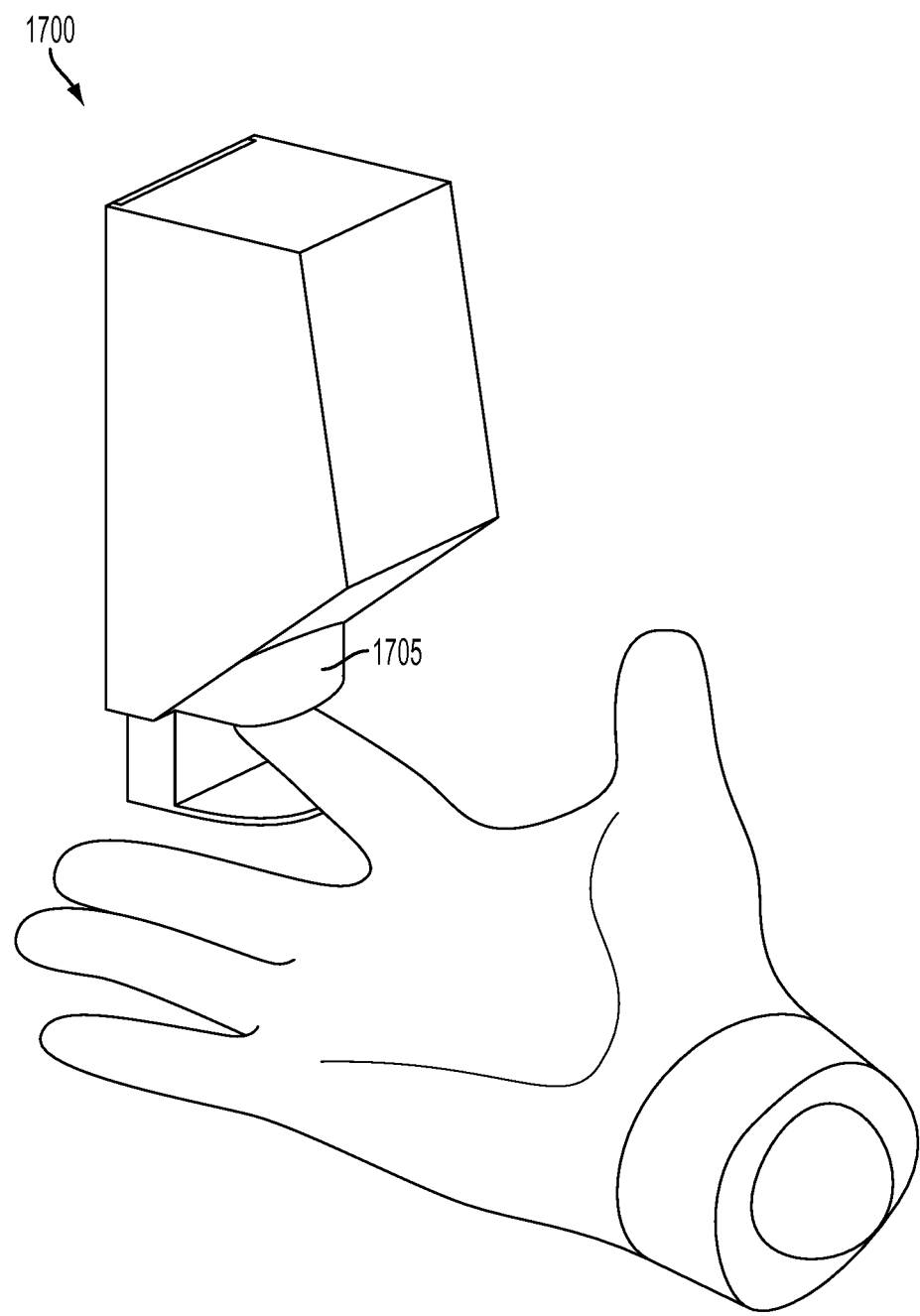
FIG. 17 illustrates a view of an exemplary contactless fingerprint acquisition and processing apparatus.

FIG. 17 illustrates a view of an exemplary contactless fingerprint acquisition and processing apparatus 1700. The apparatus 1700 can implement the methods described herein. In exemplary embodiments, the user can place a finger under an opening 1705 of the apparatus 1700.

Figure 18:
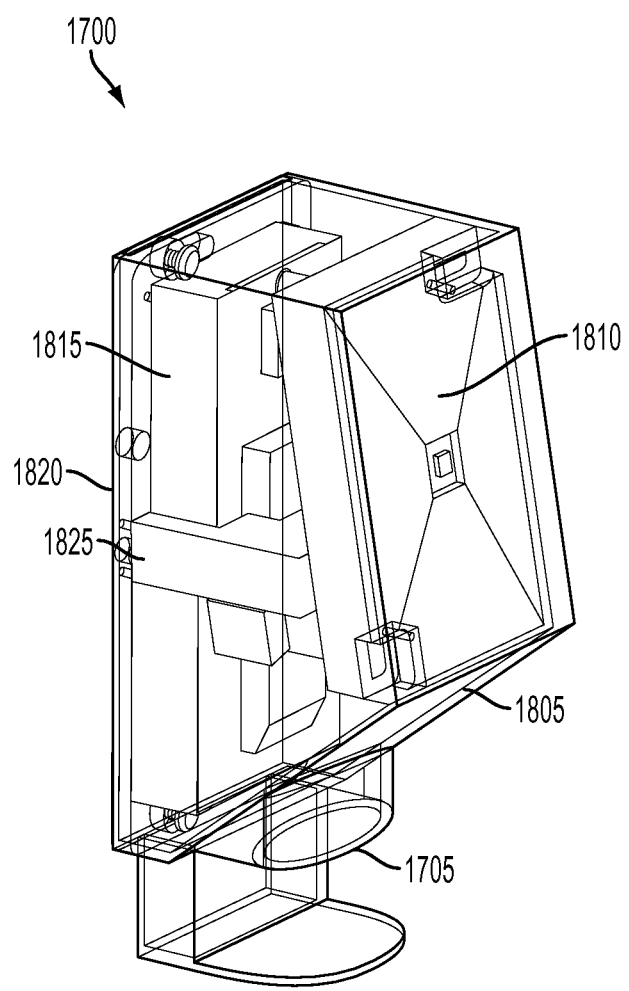
FIG. 18 illustrates a transparent view of the exemplary contactless fingerprint acquisition and processing apparatus of FIG. 17.
Figure 19:
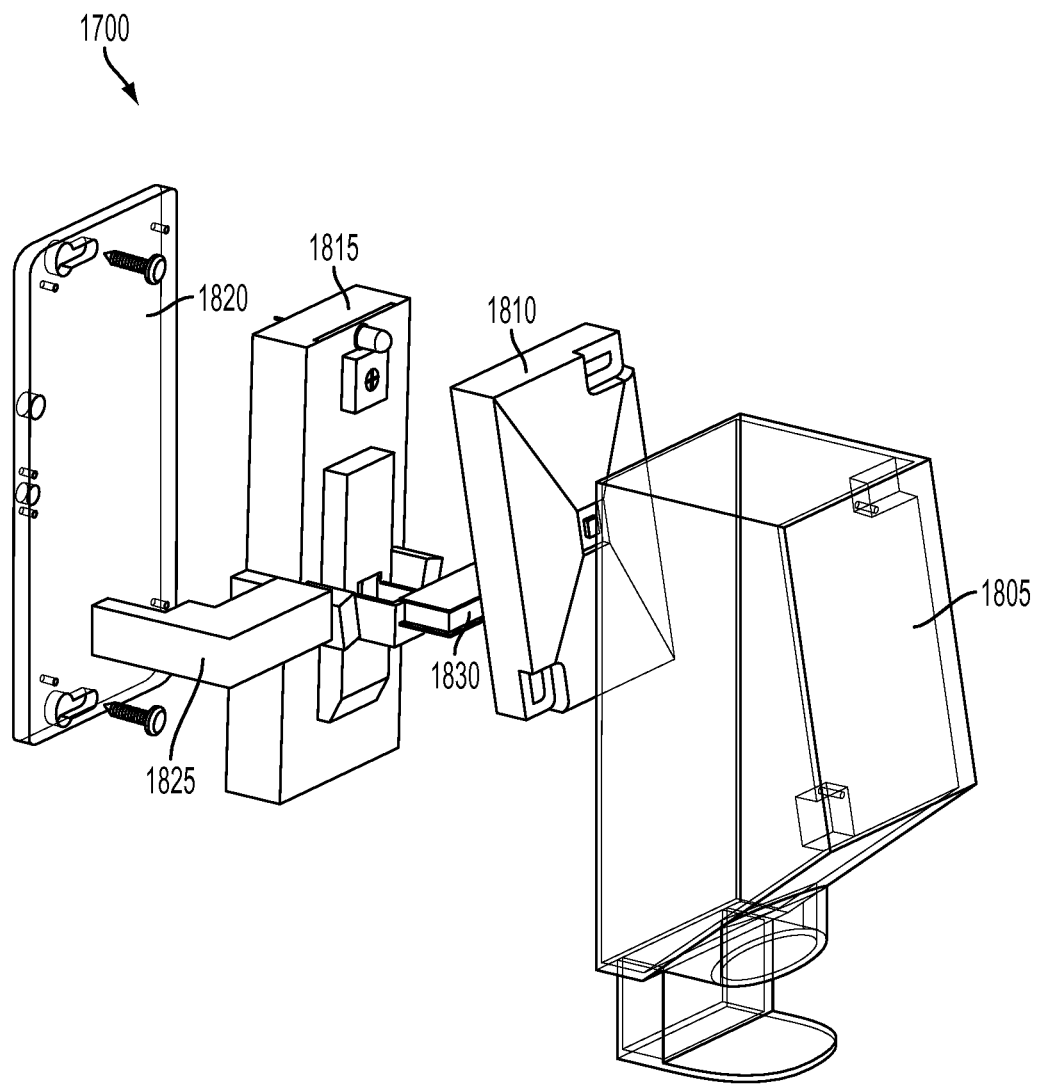
FIG. 19 illustrates an exploded view of the exemplary contactless fingerprint acquisition and processing apparatus of FIG. 17.

FIG. 18 illustrates a transparent view of the exemplary contactless fingerprint acquisition and processing apparatus 1700 of FIG. 17, and FIG. 19 illustrates an exploded view of the exemplary contactless fingerprint acquisition and processing apparatus 1700 of FIG. 17. The apparatus 1700 can include a housing 1805. The apparatus 1700 can further include a proximity card reader 1810, an electronic unit 1815, back plate 1820 and thermal path 1825, all disposed in the housing 1805. The apparatus 1700 can further include a thermo electric cooler (TEC) 1830 to control temperature for the various electronics and transfer the heat to/from the base plate, which is the attachment point to the building.

Figure 20:
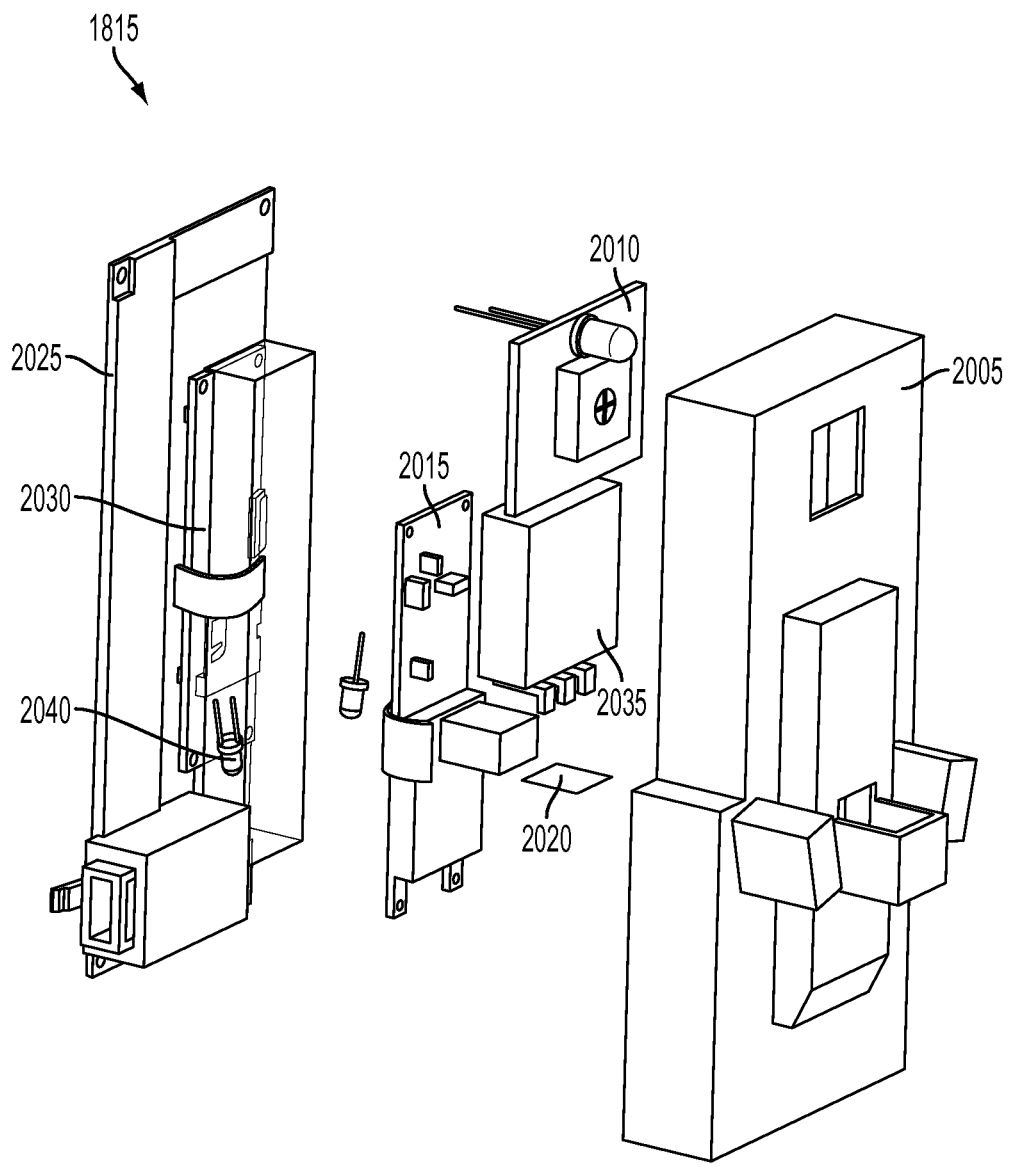
FIG. 20 illustrates an exploded view of the electronic unit of FIGS. 18 and 19.

FIG. 20 illustrates an exploded view of the electronic unit 1815 of FIGS. 18 and 19. The electronic unit can include an electronics cover 2005. The electronic unit 1815 can further include a communications board 2010 and camera board 2015 having a camera lens cover 2020, and interface board 2025 having a processor 2030 and a power supply 2035, all disposed under the electronics cover 2005. In exemplary embodiments, the camera board 2015 houses a camera that grabs the images to pass them to the processor 2030. The processor 2030 is a small form factor computer that drives the functionality of the sensor, including: image capture, preliminary processing, lighting, signaling the user, communicating to the server and/or local. The communications board 2010 is an electronics board that provides the user interface components, camera lighting 2040, signal light emitting diodes (e.g., signifies operation complete), speaker (e.g., signifies operation complete) and can also provide power conversion from 12V to 5V. The interface board 2025 receives input power from the communications board 2010, and includes an Ethernet port for network communications from/to the processor 2030.

Figure 21:
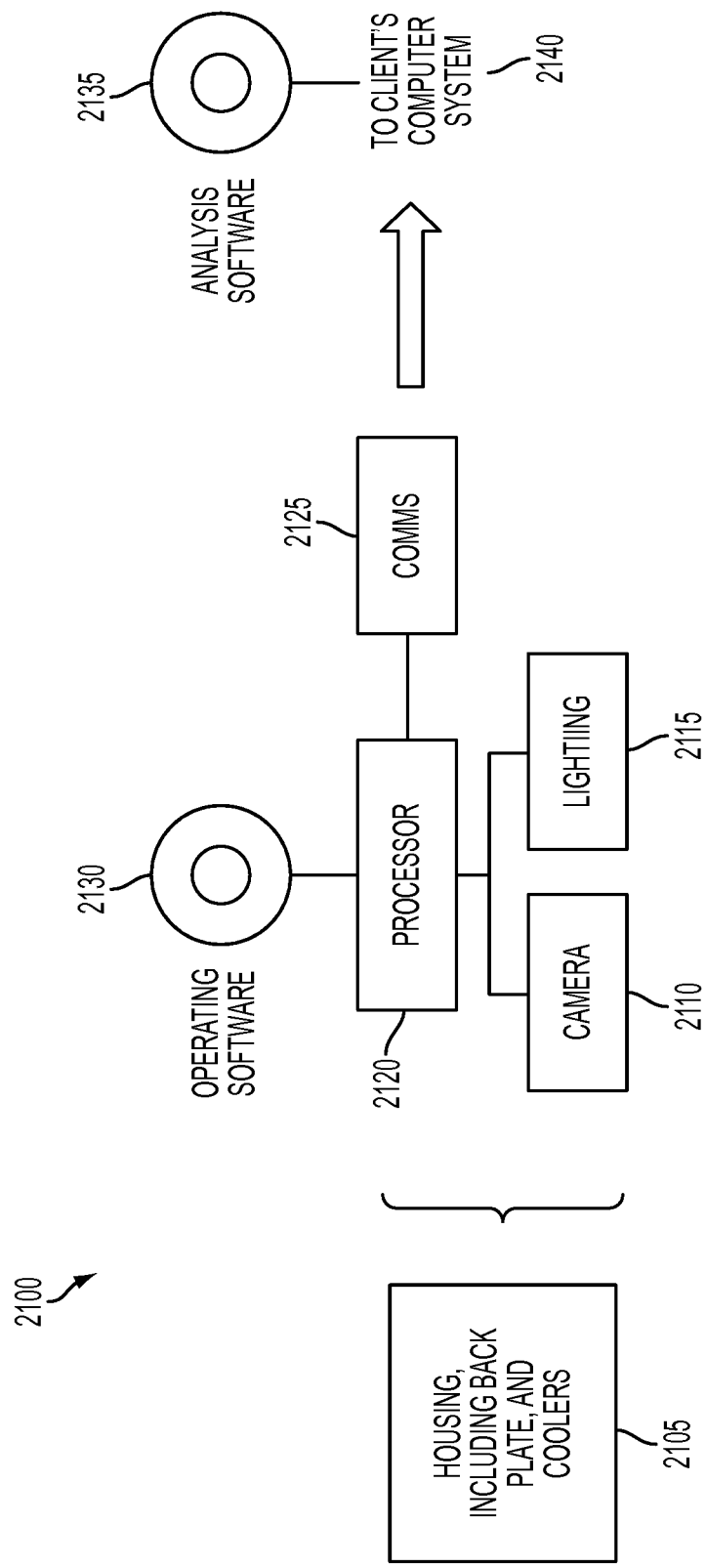
FIG. 21 illustrates a system level diagram of an exemplary contactless fingerprint acquisition and processing system.

FIG. 21 illustrates a system level diagram of an exemplary contactless fingerprint acquisition and processing system 2100. The system 2100 can include various housing structures 2105 for the components described herein. The system 2100 can further include a camera 2110 and lighting 2115 as described herein. The camera 2110 and the lighting 2115 can be operatively coupled to a processor 2120 as described herein. The processor 2120 can further be coupled to a communications module 2125. The processor 2120 can further include various operating software as described herein. The communications module 2125 can be coupled to a client computer 2140 that can include analysis software 2135, which can also reside on the processor 2120.

The computer (see FIG. 1 for example) described herein is now described in further detail. The following computing system can also describe any suitable computing system such as a fingerprint server and client computing system described herein.

Figure 22:
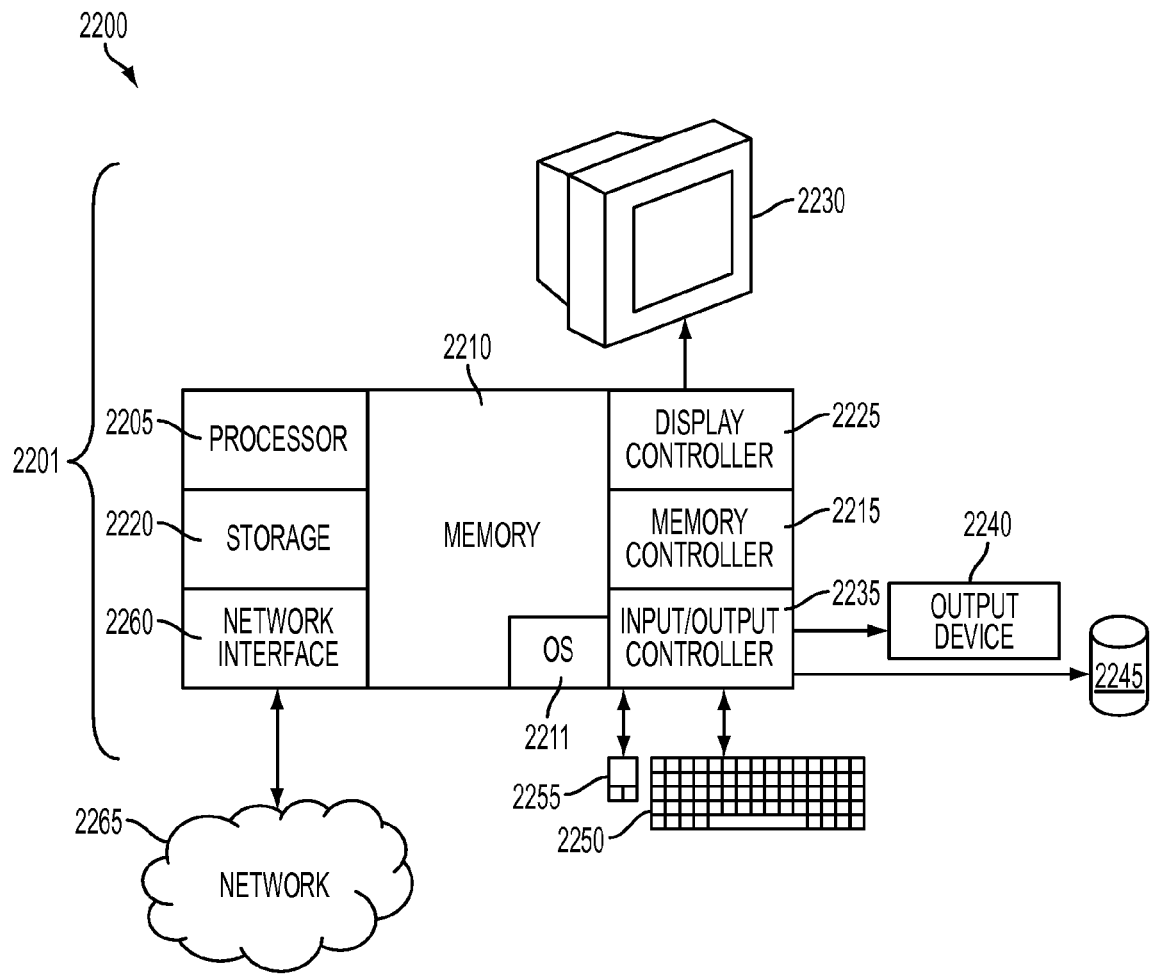
FIG. 22 illustrates an exemplary embodiment of a system for acquiring and processing contactless finger/palm prints.

FIG. 22 illustrates an exemplary embodiment of a system 2200 for acquiring and processing contactless finger/palm prints. The methods described herein can be implemented in software, firmware, hardware, or a combination thereof. In exemplary embodiments, the methods described herein are implemented in software, as an executable program, and is executed by a special or general-purpose digital computer, such as a personal computer, workstation, minicomputer, or mainframe computer. The system 2200 therefore includes general-purpose computer 2201.

In exemplary embodiments, in terms of hardware architecture, as shown in FIG. 22, the computer 2201 includes a processor 2205, memory 2210 coupled to a memory controller 2215, and one or more input and/or output (I/O) devices 2240, 2245 (or peripherals) that are communicatively coupled via a local input/output controller 2235. The input/output controller 2235 can be, but is not limited to, one or more buses or other wired or wireless connections, as is known in the art. The input/output controller 2235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 2205 is a hardware device for executing software, particularly that stored in memory 2210. The processor 2205 can be any custom made or commercially available processor, a central processing unit (CPU), an auxiliary processor among several processors associated with the computer 2201, a semiconductor based microprocessor (in the form of a microchip or chip set), a macroprocessor, or generally any device for executing software instructions.

The memory 2210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 2210 may incorporate electronic, magnetic, optical, and/or other types of storage media. Note that the memory 2210 can have a distributed architecture, where various components are situated remote from one another, but can be accessed by the processor 2205.

The software in memory 2210 may include one or more separate programs, each of which comprises an ordered listing of executable instructions for implementing logical functions. In the example of FIG. 22, the software in the memory 2210 includes the contactless fingerprint acquisition and processing methods described herein in accordance with exemplary embodiments and a suitable operating system (OS) 2211. The OS 2211 essentially controls the execution of other computer programs, such the contactless fingerprint acquisition and processing systems and methods as described herein, and provides scheduling, input-output control, file and data management, memory management, and communication control and related services.

The contactless fingerprint acquisition and processing methods described herein may be in the form of a source program, executable program (object code), script, or any other entity comprising a set of instructions to be performed. When a source program, then the program needs to be translated via a compiler, assembler, interpreter, or the like, which may or may not be included within the memory 2210, so as to operate properly in connection with the OS 2211. Furthermore, the contactless fingerprint acquisition and processing methods can be written as an object oriented programming language, which has classes of data and methods, or a procedure programming language, which has routines, subroutines, and/or functions.

In exemplary embodiments, a conventional keyboard 2250 and mouse 2255 can be coupled to the input/output controller 2235. Other output devices such as the I/O devices 2240, 2245 may include input devices, for example but not limited to a printer, a scanner, microphone, and the like. Finally, the I/O devices 2240, 2245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. For example, FIG. 19 shows the inclusion of a proximity card reader. Other devices such as a PIN keypad, microphone for voice analysis, camera for iris scan, or other biometric identifier should be included. The system 2200 can further include a display controller 2225 coupled to a display 2230. In exemplary embodiments, the system 2200 can further include a network interface 2260 for coupling to a network 2265. The network 2265 can be an IP-based network for communication between the computer 2201 and any external server, client and the like via a broadband connection. The network 2265 transmits and receives data between the computer 2201 and external systems, such as external fingerprint servers as described herein. In exemplary embodiments, network 2265 can be a managed IP network administered by a service provider. The network 2265 may be implemented in a wireless fashion, e.g., using wireless protocols and technologies, such as WiFi, WiMax, etc. The network 2265 can also be a packet-switched network such as a local area network, wide area network, metropolitan area network, Internet network, or other similar type of network environment. The network 2265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 2201 is a PC, workstation, intelligent device or the like, the software in the memory 2210 may further include a basic input output system (BIOS) (omitted for simplicity). The BIOS is a set of essential software routines that initialize and test hardware at startup, start the OS 2211, and support the transfer of data among the hardware devices. The BIOS is stored in ROM so that the BIOS can be executed when the computer 2201 is activated.

When the computer 2201 is in operation, the processor 2205 is configured to execute software stored within the memory 2210, to communicate data to and from the memory 2210, and to generally control operations of the computer 2201 pursuant to the software. The contactless fingerprint acquisition and processing methods described herein and the OS 2211, in whole or in part, but typically the latter, are read by the processor 2205, perhaps buffered within the processor 2205, and then executed.

When the systems and methods described herein are implemented in software, as is shown in FIG. 22, the methods can be stored on any computer readable medium, such as storage 2220, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the contactless fingerprint acquisition and processing methods are implemented in hardware, the contactless fingerprint acquisition and processing methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the ability to acquire fingerprint images at varying distances. The systems and methods described herein further provide identification and verification of individual fingerprints, providing both an indication to whom the fingerprint belongs as well as a confirmation of whether a fingerprint is the fingerprint of the individual asserting to be a certain person.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A contactless fingerprint acquisition and processing method, comprising:
    detecting and acquiring an object image, wherein acquiring the object image comprises illuminating an object with a light source having a polarizer, receiving data from a first detector assembly and a second detector assembly that each comprise a polarizer, wherein the polarizers of the two detector assemblies are out of phase such that the polarizer of the first detector assembly is set to match the phase of the light source polarizer and the polarizer of the second detector is out of phase with said polarizer of the first detector assembly;
    converting the object image into a fingerprint image, wherein the converting comprises differencing the data received from first detector assembly with the data received from the second detector assembly using registration information to increase a contrast between ridges and valleys of the fingerprint image; and
    at least one of identifying and verifying the fingerprint image.

2. The method as claimed in claim 1 wherein an object associated with the object image is an enrollment card.

3. The method as claimed in claim 2 further comprising enrolling a fingerprint image associated with the enrollment card.

4. The method as claimed in claim 3 further comprising generating a fingerprint template to store the fingerprint image associated with the enrollment card.

5. The method as claimed in claim 1 wherein an object associated with the object image is at least one of a finger print and a palm print.

6. The method as claimed in claim 5 wherein identifying the fingerprint image comprises comparing the fingerprint image with previously stored fingerprints.

7. The method as claimed in claim 6 further comprising generating a matching score between the fingerprint image and the previously stored fingerprints.

8. The method as claimed in claim 5 wherein verifying the fingerprint image comprises comparing the fingerprint image with a previous fingerprint image associated with an individual presenting the object image.

9. The method as claimed in claim 1 further comprising adjusting focusing on the object image, wherein adjusting focusing on the image includes at least one of a multi-frame focus, a coded aperture focus, a focus trap and stereo deconvolution.

10. A computer program product having a non-transitory computer readable medium storing instructions for causing a computer to perform a contactless fingerprint acquisition and processing method, the method comprising:
    detecting and acquiring an object image, wherein acquiring the object image comprises illuminating an object with a light source having a polarizer, receiving data from a first detector assembly and a second detector assembly that each comprise a polarizer, wherein the polarizers of the two detector assemblies are out of phase such that the polarizer of the first detector assembly is set to match the phase of the light source polarizer and the polarizer of the second detector is out of phase with said polarizer of the first detector assembly;
    converting the object image into a fingerprint image, wherein the converting comprises differencing the data received from the first detector assembly with the data received from the second detector assembly using registration information to increase a contrast between ridges and valleys of the fingerprint image; and at least one of identifying and verifying the fingerprint image.

11. The computer program product as claimed in claim 10 wherein an object associated with the object image is an enrollment card.

12. The computer program product as claimed in claim 11 further comprising enrolling a fingerprint image associated with the enrollment card.

13. The computer program product as claimed in claim 12 further comprising generating a fingerprint template to store the fingerprint image associated with the enrollment card.

14. The computer program product as claimed in claim 10 wherein an object associated with the object image is at least one of a finger print and a palm print.

15. The computer program product as claimed in claim 14 wherein identifying the fingerprint image comprises comparing the fingerprint image with previously stored fingerprints.

16. The computer program product as claimed in claim 14 wherein verifying the fingerprint image comprises comparing the fingerprint image with a previous fingerprint image associated with an individual presenting the object image.

17. The computer program product as claimed in claim 10 further comprising adjusting focusing on the object image, wherein adjusting focusing on the image includes at least one of a multi-frame focus, a coded aperture focus, a focus trap and stereo deconvolution.

18. A contactless fingerprint acquisition and processing system, comprising:
   a housing;
   a processor disposed in the housing;
   a light source having a polarizer, disposed in the housing and configured to illuminate an object;
   a first detector assembly and a second detector assembly that are both operatively coupled to the processor and configured to acquire fingerprint images, wherein each of the first detector assembly and the second detector assembly comprise a polarizer; and
   a process configured to
      detect and acquire an object image, wherein acquiring the object image comprises receiving data from the first detector assembly and the second detector assembly, wherein the polarizers of the first and the second detector assemblies are out of phase such that the polarizer of the first detector matches the phase of the polarizer of the light source;
      convert the object image to a fingerprint image, wherein converting comprises differencing the data received from the first detector assembly with the data received from the second detector assembly using registration information to increase a contrast between ridges and valleys of the fingerprint image;
      enroll the fingerprint image; and
      at least one of identifying and verifying the fingerprint image.

19. The system as claimed in claim 18 wherein the process is further configured to adjust focusing on the object image, wherein adjusting focusing on the image includes at least one of a multi-frame focus, a coded aperture focus, a focus trap and stereo deconvolution.

20. The method as claimed in claim 1 wherein converting the object image into a fingerprint image further comprises deblurring the image and enhancing ridge contours therein.

* * * * *